United States Patent
Dula et al.

(10) Patent No.: US 12,286,245 B2
(45) Date of Patent: Apr. 29, 2025

(54) SYSETEMS, METHODS, AND APPARATUSES FOR TETHER-BASED REACTION CONTROL AND ORBITAL ENERGY REDUCTION

(71) Applicant: Excalibur Almaz USA, Inc., Houston, TX (US)

(72) Inventors: Arthur M. Dula, Houston, TX (US); Neha Satak, Bengaluru (IN); Prasad Laxminarayana, Bengaluru (IN)

(73) Assignee: Escalibur Almaz USA, Inc., Houston, TX (US)

( * ) Notice: Subject to any disclaimer, the term of this patent is extended or adjusted under 35 U.S.C. 154(b) by 0 days.

(21) Appl. No.: 18/304,812

(22) Filed: Apr. 21, 2023

(65) Prior Publication Data

US 2024/0351712 A1     Oct. 24, 2024

(51) Int. Cl.
    *B64G 1/62*     (2006.01)
(52) U.S. Cl.
    CPC .................... *B64G 1/623* (2023.08)
(58) Field of Classification Search
    CPC .................. B64G 1/62; B64G 1/623
    See application file for complete search history.

(56) References Cited

U.S. PATENT DOCUMENTS

| | | | | |
|---|---|---|---|---|
| 3,241,142 | A * | 3/1966 | Raabe | B64G 1/34 343/705 |
| 3,582,016 | A * | 6/1971 | Sherman | B64G 1/365 244/167 |
| 4,580,747 | A * | 4/1986 | Pearson | B64G 1/648 244/164 |
| 5,310,144 | A * | 5/1994 | Salvatore | B64G 1/244 244/168 |
| 7,503,526 | B1 * | 3/2009 | Taylor | B64G 1/623 244/172.4 |
| 2010/0193640 | A1 * | 8/2010 | Atmur | B64G 1/66 244/158.2 |
| 2014/0166815 | A1 * | 6/2014 | Dula | B64G 1/623 244/164 |
| 2015/0076287 | A1 * | 3/2015 | Dula | B64G 1/648 244/158.2 |

* cited by examiner

*Primary Examiner* — Tye William Abell
(74) *Attorney, Agent, or Firm* — Arthur M. Dula

(57) ABSTRACT

Tether-based reaction control systems for spacecraft undergoing atmospheric entry or reducing orbital energy, including systems that use atmospheric drag on one or more tethers to alter the angle of attack of the spacecraft during its atmospheric transit to reduce the thermal and mechanical loads on the spacecraft during the reentry process. Systems may include tethers that together generate a force that functionally acts on the spacecraft at a point that is offset from the spacecraft's center of mass. Such systems may be either actively or passively controlled.

22 Claims, 19 Drawing Sheets

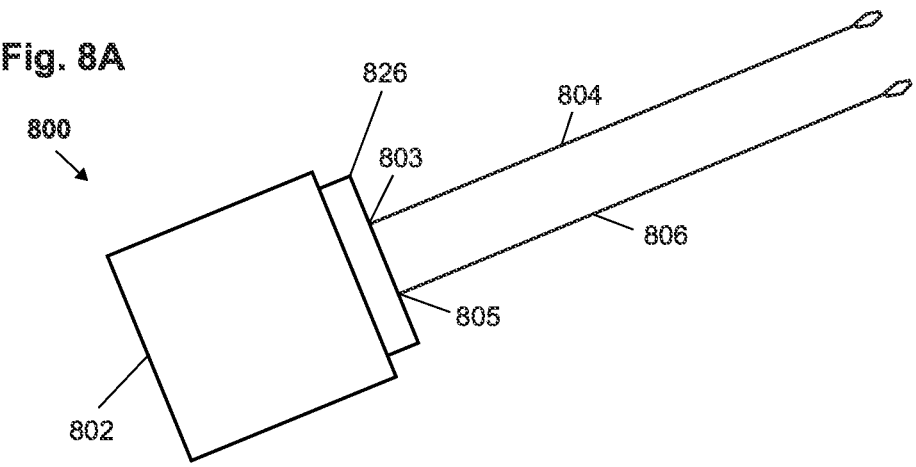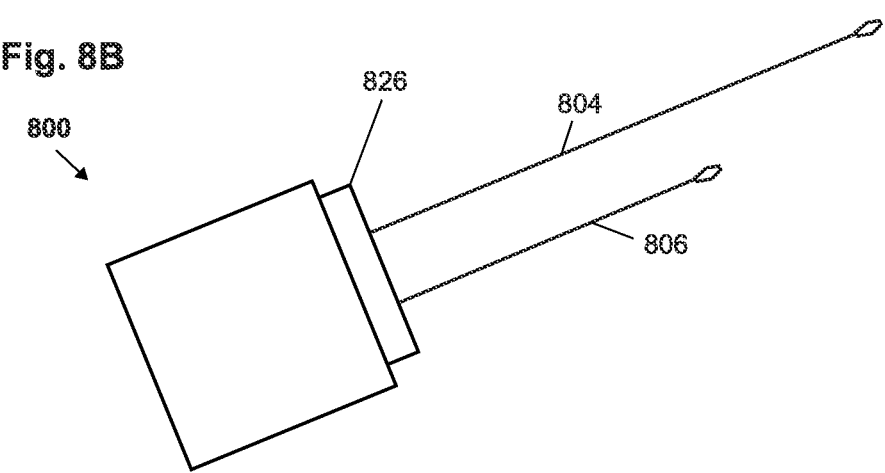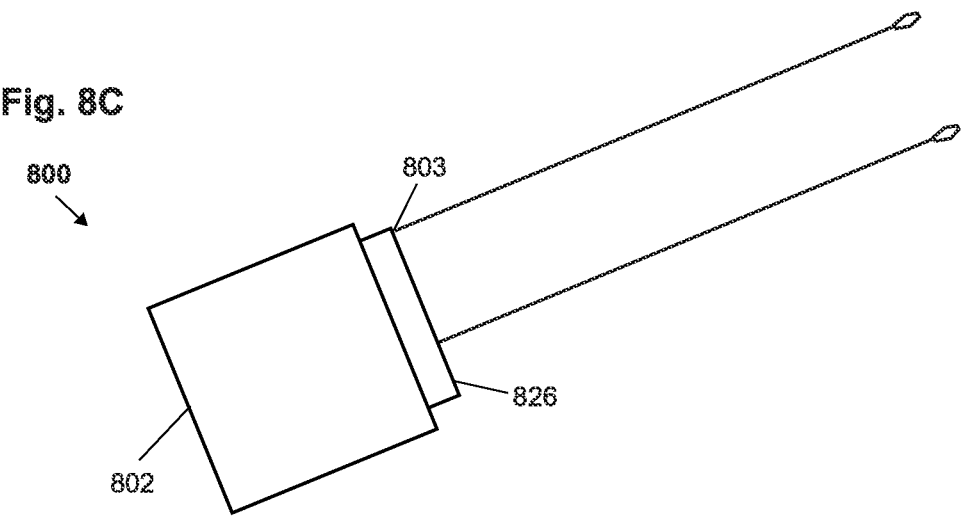

SYSETEMS, METHODS, AND APPARATUSES FOR TETHER-BASED REACTION CONTROL AND ORBITAL ENERGY REDUCTION

PRIORITY AND INCORPORATION BY REFERENCE

This non-provisional application is related to the following applications, the disclosures of which are incorporated herein in their entirety by reference as if fully set forth herein:
  a. U.S. Provisional Patent Application Ser. No. 61/464,963, entitled "Tether for spacecraft attitude control, antenna, and hypersonic parachute, with three-axis control and oxygen as a secondary reaction control system and life support system", filed Mar. 12, 2011;
  b. PCT Patent Application Serial No. PCT/US12/28841, entitled "TETHER FOR SPACECRAFT REACTION CONTROL SYSTEM", filed Mar. 3, 2012;
  c. U.S. Provisional Patent Application Ser. No. 61/801,092, entitled "Impedance matching of solid-state RF power to a dynamic plasma load with frequency control and radiation protection in space using VASIMR magnets or arrays of magnets to channel and deflect High-Energy charged particles and structural spiral engagement for ceramic-to-metal and ceramic-to-ceramic seals", filed Mar. 15, 2013;
  d. U.S. Non-Provisional patent application Ser. No. 14/025,822, entitled "TETHER FOR SPACECRAFT REACTION CONTROL SYSTEM", filed Sep. 13, 2013;
  e. U.S. Non-Provisional patent application Ser. No. 14/210,434, entitled "DEVICE AND METHOD FOR CONTROLLED ATMOSPHERIC ENTRY", filed Mar. 13, 2014;
  f. U.S. Non-Provisional patent application Ser. No. 14/469,941, entitled "TETHER FOR SPACECRAFT REACTION CONTROL SYSTEM", filed Aug. 27, 2014; and
  g. U.S. Provisional Patent Application Ser. No. 62/378,402, entitled "Atmospheric Reentry Control Apparatus and Method", filed Aug. 23, 2016.

This non-provisional application is a continuation in part of and claims the priority to U.S. Non-Provisional patent application Ser. No. 14/469,941, entitled "TETHER FOR SPACECRAFT REACTION CONTROL SYSTEM", filed Aug. 27, 2014; which is a continuation in part of U.S. Non-Provisional patent application Ser. No. 14/025,822, entitled "TETHER FOR SPACECRAFT REACTION CONTROL SYSTEM", filed Sep. 13, 2013; which is a continuation in part of PCT Patent Application Serial No. PCT/US2012/028841, entitled "TETHER FOR SPACECRAFT REACTION CONTROL SYSTEM", filed Mar. 3, 2012, and claims priority from U.S. Provisional Patent Application Ser. No. 61/801,092, entitled "Impedance matching of solid-state RF power to a dynamic plasma load with frequency control and radiation protection in space using VASIMR magnets or arrays of magnets to channel and deflect High-Energy charged particles and structural spiral engagement for ceramic-to-metal and ceramic-to-ceramic seals", filed Mar. 15, 2013; PCT Patent Application Serial No. PCT/US2012/028841 claims priority from U.S. Provisional Patent Application Ser. No. 61/646,963, entitled "Tether for spacecraft attitude control, antenna, and hypersonic parachute, with three-axis control and oxygen as a secondary reaction control system and life support system", filed Mar. 12, 2011.

This application additionally incorporates the following published technical reports by reference:
  a. Hyland, David C., Skipper Atmospheric Entry System Dynamics. Excalibur Almaz USA Inc., 2023.
  b. Satak, Neha and Bhat, Prasad H L, Skipper Report 1-18. Excalibur Almaz USA Inc., 2023.

STATEMENT RELATED TO FEDERALLY SPONSORED RESEARCH OR DEVELOPMENT

Not Applicable

FIELD OF THE INVENTION

The present disclosure pertains generally to the safe transit of a spacecraft through an atmosphere to the surface of a celestial body. More specifically, the disclosure discusses tether-based systems, apparatuses, and methods for utilizing tethers for both controlled and uncontrolled atmospheric entry that reduces the thermal and physical stresses on the spacecraft undergoing atmospheric transit. Additionally, the disclosure relates to tether-based systems, apparatuses, and methods for reducing the energy of an object in orbit about a celestial body having an atmosphere.

BACKGROUND OF THE INVENTION

Atmospheric entry/reentry refers to the process by which vehicles outside of a planet's atmosphere can enter or reenter the atmosphere and reach the surface of the planet intact. The technology for atmospheric reentry owes its origins to the development of intercontinental ballistic missiles (ICBMs) during the Cold War. Early calculations showed that the kinetic energy of a nuclear warhead returning from orbit was sufficient to completely vaporize the warhead. To prevent a spacecraft from suffering a similar fate, several obstacles had to be overcome.

There are difficulties that are inherent aspects of atmospheric entry caused by high velocity transit through an atmosphere. These problems include high temperatures generated by friction between the entry system and the atmosphere while the spacecraft is traveling through the atmosphere at high velocities, high acceleration loads experienced by the reentry system and its payload due to rapid changes in the system's velocity, and difficulty of controlling the flight path as the system descends through an atmosphere due to several causes including poor aerodynamics, high velocities, and the requirement of fast reacting guidance methods. Each of these problems can be mitigated by allowing the atmospheric transit to occur over a longer period of time to allow for better flight control and less extreme aerodynamic heating.

The transportation of a spacecraft through an atmosphere is not necessarily difficult. All that must occur is that the gravitational attraction between the object in space and the celestial body overcome the other forces acting on the object. This results in a ballistic entry into and through the atmosphere of the celestial body, followed by the object reaching the surface of the celestial body. However, entering and traversing an atmosphere ballistically is relatively uncontrolled and can be physically damaging to the object entering the atmosphere, its payload, or to the celestial body. The energy put into a spacecraft by the launch system, usually a powerful rocket, must be removed from the spacecraft before it can land without damage. The spacecraft starts at zero altitude and zero velocity. It is then accelerated to a high velocity by the launch system. For example, the velocity required to keep a spacecraft in low Earth orbit is about 18,000 miles per hour while a spacecraft on a direct return from the Moon will have a reentry velocity of about 25,000 miles per hour. The kinetic energy (Ek) of the returning spacecraft is equal to half the mass (m) of the spacecraft multiplied by the square of the spacecraft's velocity (v), expressed as $Ek=½mv^2$. The potential energy (Ep) of a returning spacecraft is its altitude (h) multiplied by its mass (m) and a gravitational constant (g), expressed as $Ep=mgh$. Most of a spacecraft's kinetic energy must be removed during reentry by aerodynamic drag between the spacecraft and the atmosphere for the spacecraft to land safely. This is why reentering spacecraft must have effective thermal protection systems, "heat shields," and even with effective thermal protection the temperature on the aerodynamic surface of the spacecraft can rise to thousands of degrees because all of the kinetic energy of the spacecraft's velocity is removed in only a few minutes of flight. This heating causes the plasma "fireball" that surrounds a reentering spacecraft.

Deceleration is one obstacle in atmospheric reentry. The Earth's rotational velocity is approximately 1000 miles per hour at the equator, and slower as a cosine function at higher latitudes. When a spacecraft leaves Earth orbit and prepares for reentry, it can be traveling as fast as 18,000 mph. From the time of reentry to just before landing, the spacecraft must decelerate to match the Earth's rotational velocity as closely as possible. Deceleration is generally accomplished by relying on atmospheric friction and drag (i.e., using wind resistance), a technique known as aerobraking. Aerobraking, however, presents another obstacle. The air in the Earth's atmosphere is composed mostly of nitrogen and oxygen. When an object such as a spacecraft moves through the atmosphere at supersonic speeds, it generates shockwaves as it collides with particles in the atmosphere. Since the orbital velocity for most spacecraft is about 25 times the speed of sound, air molecules in the path of the spacecraft are "shock heated", i.e., compressed so violently that the temperature of the shockwaves increases to several thousand degrees. To provide an example, meteorites entering the Earth's atmosphere are often vaporized by their own shock waves. Because of shock heating, reentry space vehicles require a heat shield of some form, usually comprising ablative materials and highly effective insulators. The spacecraft must also have great structural strength to bear the deceleration mechanical loads generated by these forces which have been measured to be 6 to 40 gravities or more (60-2300 m/s2)

Additionally, a spacecraft's speed and the resulting collisions with molecules in the atmosphere break up neutral atoms and molecules into electrons and ions. In high-speed flows, shock heating and viscous dissipation in the boundary layers will first lead to a dissociation of the participating molecules (breaking the molecules into their individual atoms). At higher temperatures the collisions are so violent that the electrons are knocked clear of the nucleus. These free electrons and ions form plasma. Reentry vehicles all generate plasmas due to shock and boundary layer heating, Radio waves cannot penetrate the highly conductive plasma, and therefore, reentry vehicles suffer from a temporary radio blackout during reentries. Much of this shock heating occurs in the thin, high altitude, atmosphere near the Von Karman limit (100 km).

Resulting heat from collisions with molecules in the atmosphere makes it imperative for a spacecraft's reentry "angle of attack," relative to the atmosphere, to fall within a certain range. The angle of attack must be oriented so that the heatshield absorbs the bulk of the reentry heat. If the angle of attack is too shallow, the spacecraft will skip off the atmosphere and back towards space (like a stone being skipped across the surface of a lake. If the spacecraft's angle of attack is too steep, the spacecraft risks burning up due to extremely high heat loads from excess friction with air molecules. The window of a successful angle of attack depends on the spacecraft's geometry, speed, and surrounding air density. Air is less dense in the upper atmosphere, and thus, a spacecraft will encounter less friction. By approaching the Earth at a shallow angle, the spacecraft can spend more time in the upper atmosphere and increase the duration of deceleration. As the spacecraft moves lower into the atmosphere, it may have to adjust its angle of attack by means of a reaction control system, a mechanism for attitude control.

A reaction control system ("RCS") is a subsystem of a spacecraft that is used for reentry flight dynamics. RCS' are used for attitude control and steering. Attitude control refers to control of the angular position or rotation of the spacecraft relative to the object it is orbiting. These angles are referred to as pitch, yaw, and roll. An RCS system can provide small amounts of thrust in a desired direction or combination of directions. An RCS system is also capable of providing torque to allow control of rotation. In contrast to a spacecraft's main engine, which is only capable of providing thrust in one direction but is much more powerful. RCS systems can be used not only for attitude control during reentry, but also for station keeping in orbit, close maneuvering during docking procedures, control of orientation, and as a backup means of de-orbiting.

On Apr. 12, 1961, the Soviet space program launched Vostok I, the first manned space flight. Although the service module of Vostok I had a nitrogen gas RCS system, the reentry spacecraft lacked an RCS system and was unable to perform attitude control in flight. Hence, the Vostok I reentry spacecraft was designed as a sphere with a heatshield covering the entire outer surface of the spacecraft.

U.S. Pat. No. 3,093,346, by Faget, discloses a space reentry spacecraft with attitude control via means of generating torque thrusts. The '346 patent was the design for the spacecrafts for Project Mercury, the first United States manned flight space program. The Mercury spacecrafts were equipped with hydrogen peroxide (H202) RCS systems providing thrust for attitude control.

Over the years, RCS systems have improved, but generally maintain the same operating concepts. Conventional RCS systems are limited by the amount of fuel the spacecraft can carry. If the fuel is completely exhausted before reentry is achieved, the spacecraft will lose its ability for attitude control.

Beginning with the United States Gemini Program, the standard for fuel on many RCS systems has been a hi-propellant hypergolic liquid combination of an oxidizer and hydrazine or a hydrazine derivative. One example is monomethyl hydrazine ($CH_3N_2H_2$) with nitrogen tetroxide ($N_2O_2$) as an oxidizer. As a hypergolic combination, the constituents ignite on contact with each other and create the thrust force for the RCS system. The disadvantages are that hydrazine, hydrazine derivatives, and nitrogen tetraoxide are generally expensive and toxic. Orion Propulsion, Inc. has developed an oxygen and methane RCS thruster for use on spacecraft. However, the inventor is not aware of an RCS system that uses oxygen or a mixture of oxygen and other gases (i.e., nitrogen) breathable by humans having the further feature of serving as part of a secondary life support system. Because spacecraft can only carry a finite amount of fuel with little chance to refill, some alternative RCS systems have been developed so that fuel can be conserved. One such alternative RCS system used momentum wheels which spin to control rotational rates on a vehicle. U.S. Pat. Nos. 6,834,561, 6,463,365, and 5,386,738 describe a control moment gyroscope ("CMG") for spacecraft attitude control consisting of a spinning rotor and one or more motorized gimbals that tilt the rotor's angular momentum. As the rotor tilts, the changing angular momentum causes a gyroscopic torque that rotates the spacecraft.

A tether is a long cable usually made of thin strands of high-strength fibers and/or conducting wires. It is known in the art to use tethers to decelerate and deorbit an object in orbit around a celestial body. The inventor is not aware of any publication describing the use of a tether for spacecraft attitude control.

The NASA Hypersonic Inflatable Heat Shield Prototype, which was tested sub-orbitally on Jul. 23, 2012, is an example of an inflatable reentry system. This inflatable aeroshell flew on a suborbital trajectory to an altitude of 450 km, was inflated from a 22-inch wide 308 kg spacecraft into a 10-foot wide aeroshell and reentered successfully. This inflatable aeroshell, although having the great benefit of being lightweight, experienced 20 gravities of force and 1,000 degrees Fahrenheit of heat load during the suborbital reentry.

Another example of an inflatable aeroshell reentry system is the Russian Inflatable reentry and Descent Technology system that was launched to Low Earth Orbit in February 2000 from the Baikonur Cosmodrome. After completing six orbits of the Earth, the system reentered, but it also experienced extreme and uncontrollable thermal and force loads.

It should be noted that both inflatable reentry aeroshell vehicles incorporate robust thermal protection systems adapted to withstand ballistic reentry from hypersonic and orbital velocities. Neither of these aeroshell inflatable reentry systems has any means of controlling its trajectory, angle of attack or g-force load.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF INVENTION

The present invention is directed at systems, methods, and apparatuses which satisfy the need to overcome the cost, as well as the fuel, complexity, and reliability limitations of conventional RCS systems, and which may provide for reduced physical and thermal strains on a reentering spacecraft.

As used herein the term spacecraft should be understood to mean any man-made or natural object in space, such as a capsule, a space shuttle, a space plane, a satellite, an astronaut in a space suit, a rocket engine or stage thereof, an ore body, space debris, etc. Furthermore, the term forebody shall be understood to mean the dominant aerodynamic portion of any such spacecraft, and at times may be used interchangeably therewith. Additionally, the terms reentry and entry should be considered synonymous and should be understood to not require the spacecraft to have previously been in an atmosphere.

Embodiments of the tether-based RSC systems disclosed herein enable spacecraft attitude control by generating moments about the center of mass, producing angular acceleration. Embodiments do not require motorized gimbals or spinning rotors to generate a torque force. Rather, torque is generated by producing a friction force on a tether which is attached to a forebody at a distance from center of mass along an axis of rotation. The tether may be attached to the object via a control mechanism, such as a reel that can vary the length of the section of tether extended from the body of a spacecraft, or an actuator that can alter the attachment point of the tether to the forebody. The tether can be kept enclosed within the spacecraft during flight and deployed or extended when the object is preparing for, or undergoing, atmospheric entry. The tether control mechanism can be operated by a source onboard the spacecraft, or from a remote facility. An excessive length of tether may be wound about the tether control mechanism so that an additional length of the tether can be unreeled if part or all of the extended portion of tether is severed or burned away from the spacecraft during reentry. The tether, when extended from the spacecraft, functions as a hypersonic decelerator, decreasing the spacecraft's velocity via drag forces.

In accordance with an embodiment, the tether(s) can be made, in part or in whole, of a heat resistant material with conductive properties making it suitable to function as an antenna. The unexposed end of the tether proximate the spacecraft can be integrated with the spacecraft's radio communications system. This way, a tether can serve as an antenna for transmitting and receiving radio communications even during the reentry process when plasma generated by the spacecraft's friction with the atmosphere tends to black-out radio communications. In such embodiments, the conductive tether may be extended to a length sufficient for it to permit radio communications to avoid the conductive plasma generated from shock and boundary heating during reentry, allowing the spacecraft the benefit of continuous radio communications throughout the reentry process.

Embodiments may comprise a tether control mechanism that may be configured to facilitate the controlled offsetting of the functional attachment point of one or more tethers to the forebody from a spacecraft's center of mass for the purpose of attitude control. If there is no offset, the tether control mechanism may be considered as being at a "zero position", or centrally aligned with the spacecraft's Z axis. During reentry, due to drag forces, the extended tethers will hold a position parallel to the direction of air resistance relative to the spacecraft. By offsetting one or more of the theaters while a drag force is exerted upon them, a moment equal to the drag force multiplied by the distance of the offset from the zero position will be produced about the spacecraft's center of mass. Moments created by the offset and drag forces can be used to alter angle of attack, pitch, yaw, and roll with regards to attitude control.

Embodiments comprising a plurality of tethers, when said tethers are placed under tension, may generate and impart to the forebody a "differential tether force" equal to the sum of the forces of tension acting on each of the plurality of tethers. The differential tether force may be configured to be offset from the spacecraft's center of mass to generate a moment like that described above. The differential tether force may lessen or eliminate the need for active control of the RCS system.

Embodiments may provide for structures ("aftbodies") that may be attached to the distal end of the tether(s) to stabilize the dynamics of the tethers during flight, and/or to add to the drag forces acting on the spacecraft.

Further embodiments may provide for a system for orbital energy reduction and eccentric orbit circularization, whereby one or more tether(s) may be deployed from a spacecraft in orbit about a celestial body. In such an embodiment, the free end of the tether may dip into an atmosphere surrounding the celestial body, thereby causing drag and reducing the energy of the spacecraft's orbit.

BRIEF DESCRIPTION OF DRAWINGS

For a more complete understanding of the present invention, and the advantages thereof, reference is now made to the following descriptions taken in conjunction with the accompanying drawings, in which:

FIG. 8A depicts an exemplary embodiment of a multi-tether RCS system comprising a tether control mechanism attached to and between the system's tethers and forebody, wherein the tethers are each a first length, and wherein each of the tethers are attached forebody/tether control mechanism system at a point that is offset from the system's center of mass along at least one axis by a first magnitude.

FIG. 8B depicts the exemplary embodiment of a multi-tether RCS system comprising a tether control mechanism of FIG. 8A, wherein at least one of the tethers has been either extended or retracted from the first length to a second length via operation of the tether control mechanism.

FIG. 8C depicts the exemplary embodiment of a multi-tether RCS system comprising a tether control mechanism of FIG. 8A, wherein at least one of the tethers' point of attachment to the forebody has been translated along at least one axis via operation of the tether control mechanism, such that said tether's attachment point to the forebody/tether control mechanism system is offset from the system's center of mass along at least one axis by a second magnitude.

DESCRIPTION OF EMBODIMENTS

Figure 1:
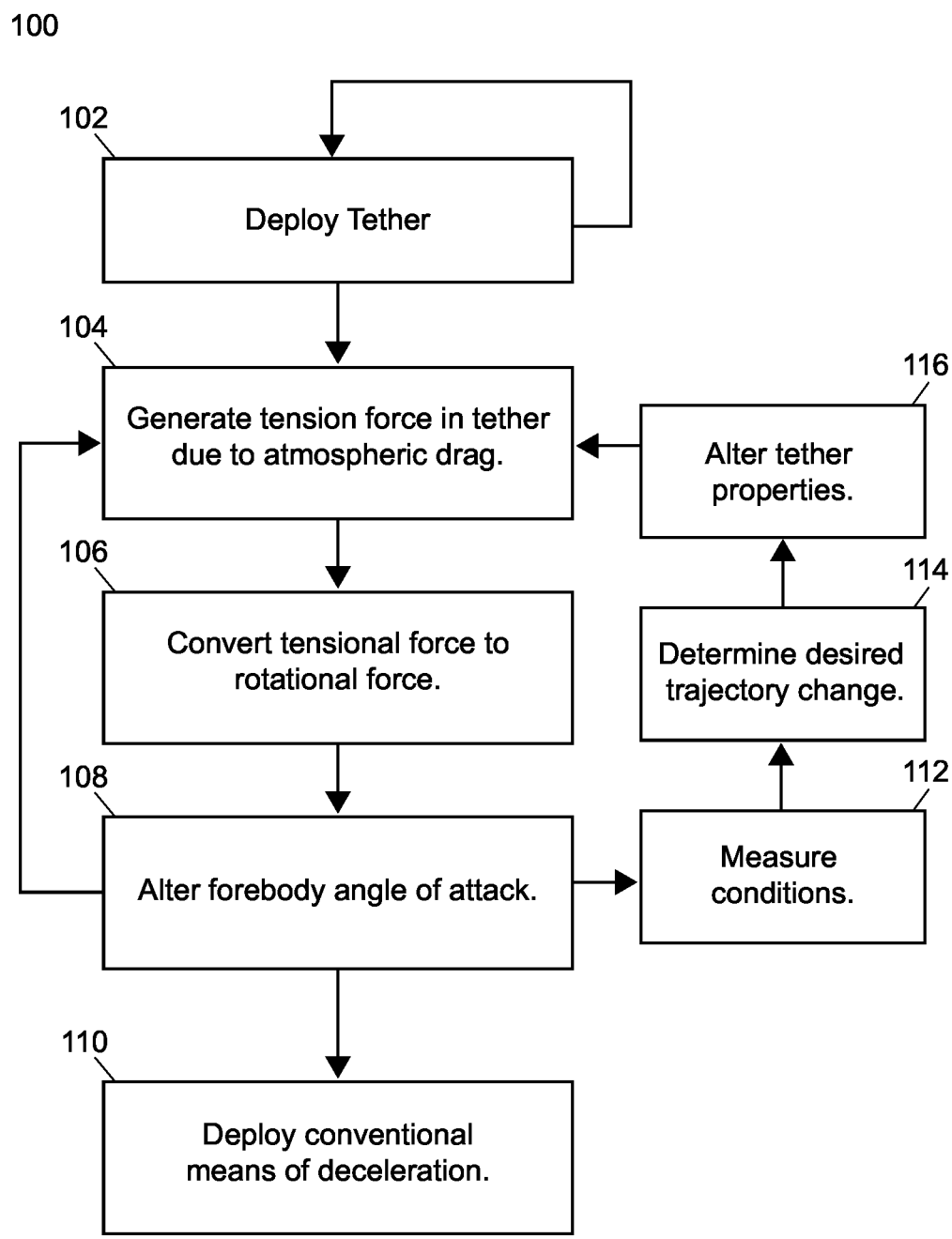
FIG. 1 depicts a flowchart detailing an exemplary embodiment of a method of spacecraft reaction control using an RCS system comprising one or more tethers.

Due to the financial impracticality of experimentally testing the subject matter of the present disclosure, customized mathematical and physics models were created and used for computer simulated experimental testing. These mathematical models, physics simulations, and their results can be found in the published report Hyland, David C., Skipper Atmospheric Entry System Dynamics. Excalibur Almaz USA Inc., 2023; and Satak, Neha and Bhat, Prasad H L. Skipper Report 1-18. Excalibur Almaz USA Inc., 2023. The simulations independently verify and validate the prior generalized mathematical treatment. The following is a description of several embodiments that are most illustrative of the material described in said generalized mathematical treatment and said reports.

In the following description, for purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

"Skip entry" is a technique for entering an atmosphere. It is beneficial for entry systems that have a relatively low lift-to-drag ratio since these sorts of entry systems have difficulty extending their landing range and deceleration period due to their aerodynamic flight characteristics. When engaging in skip entry a spacecraft makes one or more successive "skips" off of (or through) the atmosphere. Each successive "skip" reduces the energy of the spacecraft relative to the celestial body whose atmosphere is being entered. The skip entry provides a spacecraft entering an atmosphere a longer period of time and course of transit through the atmosphere. The increased period of transit increases the duration of time during which the entering object can shed energy relative to the celestial body. By increasing the duration of the atmospheric transit, the energy of the spacecraft can be released more gradually. This gradual reduction of the spacecraft's energy is advantageous because it reduces both heating and rapid deceleration due to frictional forces that result from the spacecraft's physical interaction with the molecules of gas and other particulates that comprise the atmosphere. Methods of achieving skip entry require precise guidance and control of the spacecraft. Without precise guidance and control the spacecraft attempting to achieve skip entry could fail to sustain its intended trajectory, which could result in one of several problems. If the spacecraft takes too shallow of an entry trajectory, or achieves too much lift upon entry, the spacecraft could skip entirely out of the atmosphere, and possibly out of the celestial body's gravity well. This could result in the complete loss of the spacecraft and its payload. If the spacecraft takes too steep of a trajectory, or has too small a velocity, the aerodynamics of the system may not generate enough lift for the spacecraft to perform skip entry. This could cause the spacecraft to engage in ballistic entry which could potentially destroy the spacecraft and its payload due to excessive heating, high acceleration loads, or a high velocity impact with the surface of the celestial body. Another problematic possibility is that the spacecraft may achieve skip entry but does so in such a way as to have the system and payload move off its intended trajectory and land in an unintended location. The increased transit duration is effectively an increased flight path which allows for the spacecraft to select a landing location from a larger potential landing area.

The method of skip entry into an atmosphere is achieved by calculating an appropriate trajectory, then initially descending into the outermost region of the atmosphere. After the initial descent, the aerodynamic profile of the spacecraft (with or without help from some other forces including thrust or drag) generates lift which causes the entry system to ascend. As the spacecraft gradually ascends the gravitational force overrides the lift force and the object begins another descent into the atmosphere. This process may be repeated more than once before the spacecraft loses the velocity (or other flight characteristics) required to generate sufficient lift to make another "skip." When the object cannot, or does not wish to, make another "skip," the spacecraft travels along a ballistic trajectory through the remainder of the atmosphere. These "skips" increase the duration of the spacecraft's transit in the upper, less dense, atmosphere. The increased duration of the atmospheric transit and the lower instantaneous deceleration gives this method of atmospheric entry many advantages as compared to fully ballistic atmospheric entry. Such high-speed aerodynamic flight math models are know to those skilled in the art.

Increased duration of flight in the upper atmosphere is desirable because this is where most of the energy of reentry is dissipated. If the total energy release is made over more time, the effect is a much gentler and less stressful reentry. Additionally, using skip entry methods, the deceleration of the system can be made more gradually resulting in lower acceleration loads being put on the spacecraft and payload. Slower deceleration results in less intense aerodynamic heating of the spacecraft. Lower velocities and increased transit duration also reduce heat buildup and acceleration loading on the spacecraft, which in turn allows for a reduction in mass necessarily dedicated to heat-shielding. Additionally, increased atmospheric transit time coupled with the lower velocities that the spacecraft achieves during the atmospheric entry allows the spacecraft more time for, and ease of, maneuvering.

Skip entry was considered for use in the Apollo program but was abandoned due to fuel limitations of the RCS system. Skip entry was used successfully by the Chinese lunar sample return mission Chang'e 5 on Dec. 16, 2020, over the Arabian Sea and south-central Asia.

One aspect of the present invention is a reaction control system ("RCS") for atmospheric entry comprising a forebody, trailing a long, thin aerodynamic decelerator tether, which may be of any length and shape. The forebody may be shaped to provide various desirable aerodynamic properties, e.g., a particular lift-to-drag ratio, etc. The tether is placed in tension due to aerodynamic forces applied during entry. The tether may have an aftbody attached to the end of the tether opposite the tether's attachment point to the forebody.

Referring now to the attached figures, FIG. 1 depicts an exemplary method for atmospheric reentry using a tether-based RCS system, method 100. Method 100 comprises step 102 wherein a tether is deployed from the forebody of a tether-based RCS system. In embodiments, step 102 may be iterated repeatedly such that a plurality of tethers are so deployed. Once on or more tethers have been deployed in accordance with step 102, method 100 may proceed to step 104 wherein the deployed tether(s) generate a tension force due to their frictional interaction with the atmosphere during the system's atmospheric transit. The forces generated by the tether(s) at step 104 may be imparted to the forebody via the tethers' respective points of attachment thereto, resulting in step 106 wherein said tensional forces are converted to a moment/torque force about the system's center of mass. The rotational forces developed in step 106 may be used at step 108 to alter the angle of attack of the forebody.

In embodiments, step 108 may loop back into step 104 so that the alteration of the forebody's angle of attack at step 108 changes the forces generated by the tethers at step 104.

In embodiments, if the tether-based RCS system performing such a method of atmospheric reentry comprises suitable components, such as for example sensors for measuring altitude, the horizontal and vertical components of velocity, and tether sag angle, and a tether control mechanism (discussed below), method 100 may additionally comprise, step 110 wherein various conditions of the systems atmospheric transit may be measured by way of such sensors. Information collected at step 112 may be used at step 114, wherein one may determine any desired changes in the system's trajectory, and any such desired trajectory changes determined at step 114 may be used at step 116, wherein one or more tether properties, such as tether length or a tether's point of attachment to the forebody, may be altered so as to produce conditions more favorable for generating the tensional forces at step 104 required for the system to maintain preferred flight characteristics. Such embodiment of method 100 may comprise a loop comprising steps 104, 106, 108, 112, 114, and 116, which may be iterated to provide for active control of the spacecraft during the process of reentry.

In embodiments, method 100 may further comprise step 110, wherein a conventional declaration means, such as one or more parachute(s), inflatable cushions, or other such means known in the art, are deployed once the system has reached a predetermined velocity and/or altitude. Such known final deceleration means may be used for the final portion of the systems descent through the atmosphere, to the surface of the celestial body.

In order to practice the methods of atmospheric reentry using a tether-based RCS system, such as those discussed above in reference to FIG. 1, multiple embodiments of tether-based RCS systems, including multi-tether RCS systems are disclosed.

A tether-based RCS system utilizing a plurality of tethers may be implemented wherein the attachment points of each of the plurality of tethers are attached to the forebody at different locations. Each of the plurality of tethers may generate a drag force that acts on the forebody, and the sum of the forces acting on the forebody via the plurality of tethers (the "differential tether force") may be used to impart a moment/torque on the system to modify the angle of attack of the forebody. A key aspect of the operation of such systems is that the functional application of the differential tether force acting on the forebody be offset from its center of mass. This may be achieved even if one or more tether(s) are attached to the forebody at its center of mass. This may also not be achieved even if each tethers' respective attachment point to the forebody is not along the forebody's center of mass. It is the functional location of the sum of the forces exerted by all tethers attached to the forebody that is important.

Figure 2:
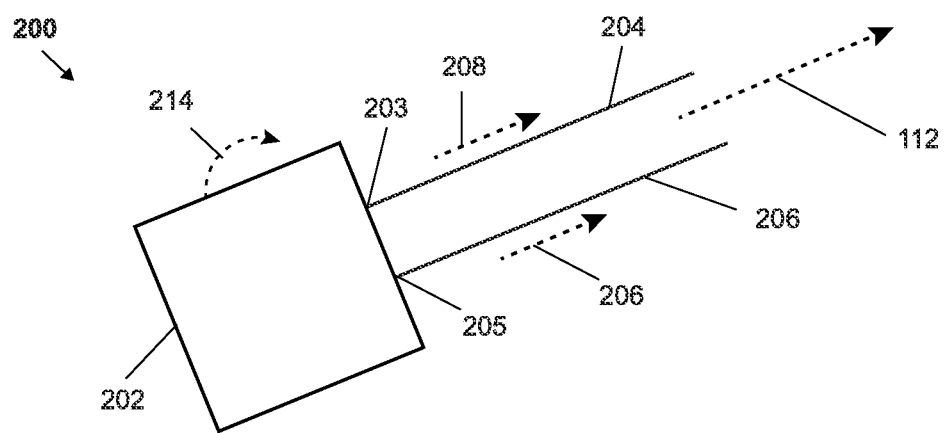
FIG. 2 depicts an exemplary embodiment of a multi-tether RCS system comprising two tethers of equal length, as well as drag and rotational forces that may act on the system during atmospheric transit.

FIG. 2 depicts an exemplary embodiment of a multi-tether RCS system, system 200, comprising forebody 202, tethers 204 and 206. Tethers 204 and 206 are each attached to forebody 202 at their respective tether attachment points 203 and 205. In the embodiment depicted, tethers 204 and 206 comprise equal lengths.

When transiting through an atmosphere, tether 204 may generate tension force 208, and tether 206 may generate tension force 210. Tension forces 208 and 210, generated by tethers 204 and 206, respectively, each operate on forebody 202 at their respective tether attachment points 203 and 205, and may be functionally combined to form differential tether force 212, which imparts moment/torque 214 about the center of mass of forebody 202. Moment/torque 214 may cause a change in the angle of attack of forebody 202, which may generate lift.

According to mathematical models, tethers appear to be quite efficient in redirecting the angle-of-attack of the forebody to match the tether tangent direction near the point at which the tether is attached to the forebody.

The further the tether attachment point is offset from the center of mass, or the longer the tether, the higher magnitude of the moment/torque that may be generated. The moment/torque generated by the tether may cause the forebody's angle of attack to change. This change in angle of attack may be used to increase the lift acting on the system, which allows for flight trajectories that provide significant benefits over those in the art.

If the tether is maintained in its sagged equilibrium shape, without oscillation, the main effect is to impose a positive angle-of-attack on the forebody. To secure this advantage over all altitude and velocity ranges, the tether length should be just long enough to provide the control force required, and no longer. Moreover, a long tether will experience extreme heating rate gradients and frequent breakage near the free end. Accordingly, it may be optimal for the systems' tethers to be as short as possible while still being able to provide the drag characteristics required to suitably control the spacecraft's reentry.

The sag angles, thicknesses, and lengths of the tethers, the aerodynamic characteristics of the aftbodies, and other variables can each affect the tether forces acting on the forebody at the tethers' respective attachment points, and therefore affect the differential tether force.

In various embodiments, multi-tether RCS system may achieve and/or alter the differential tether force required to alter the spacecraft's angle of attack by means including, but not limited to, 1) attaching an aftbody to the distal end of one or more of the tether(s), 2) varying the lengths of the tethers, 3) varying the displacement of the attachment points of one or more of the tether(s) relative to the forebody's center of mass and/or each other, 4) the number of tethers offset from one another in an axis, 5) the diameter of the tether(s), and 6) varying the aerodynamic characteristics of the aftbodies. What is of key importance is the system/method of atmospheric relying on a plurality of tethers is the differential tether force, which is the force that imparts a torque/moment/torque on the forebody to change its angle of attack. In embodiments one or more of these characteristics may be varied between the pluralities of tethers/aftbodies to generate the differential tether force.

For example, since at the beginning of the reentry process there the atmosphere is very diffuse, the force of tension acting on the tethers at their respective attachment points to the forebody may be initially small and highly sensitive to initial conditions. For this reason, it may be beneficial for the system to comprise an aftbody attached to one or more of the plurality of tethers in order to increase the amount of drag that the system experiences during the initial phase of the system's atmospheric transit.

Figure 3:
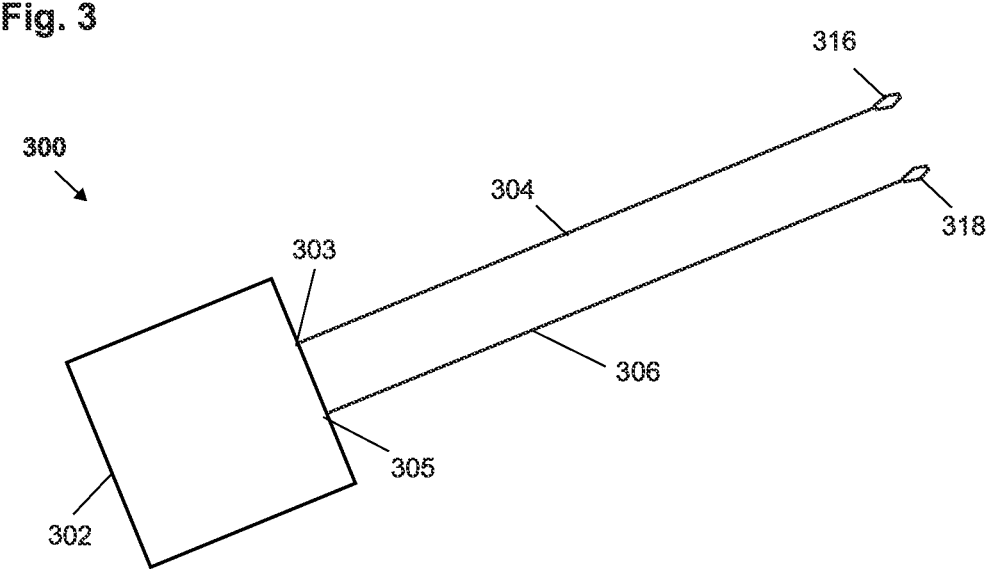
FIG. 3 depicts an exemplary embodiment of a multi-tether RCS system comprising two tethers and an aftbody attached to a distal end of each of said tethers.

FIG. 3 shows an exemplary embodiment of a multi-tether RCS system, system 300, comprising forebody 302, tether 304 connected to forebody 302 at attachment point 303, tether 306 connected to forebody 302 at attachment point 305, aftbody 316 connected to a distal end of tether 304 opposite attachment point 303, and aftbody 318 connected to a distal end of tether 306 opposite attachment point 305, wherein tether attachment points 303 and 305 are offset from the center of mass of forebody 302.

The addition of an aftbody may be useful in reducing the system's sensitivity to initial conditions, to stabilize the dynamics of the tether throughout the duration of the atmospheric transit, and to generate non-negligible tether tension in the early part of the entry trajectory.

Assuming an aftbody having suitable aerodynamic properties, the tension generated by the tether/aftbody is nearly always positive and changes in the shape of its associated tether may become much smoother than those of a tether having no aftbody. This may also reduce the possibility of the tether experiencing whip-like snaping that can cause the tether to break or become entangled. When using some embodiments of aftbodies, the motion of their associated tether may show a steady convergence toward the X axis and becomes nearly a straight line in the later stages of the entry process. After several initial oscillations, the maximum displacement of the tether from the X axis may be significantly reduced and the shape may become nearly a straight line. At the same time the tension may settle down to a nearly constant distribution.

For a reasonably sized aftbody, the contribution of the aftbody to the tether's equilibrium in the normal direction may be negligible.

A small aftbody attached to a long tether may assist in reducing chaotic motion initial deviations from the equilibrium state.

Aftbody design parameters should be chosen to promote favorable flight conditions and prevent conditions that could cause the system to experience negative issues; such as, for example, to prevent instability, including chaotic oscillations at the terminal end of the tether ("flag flutter instability").

As aftbody characteristics may be tailored to achieve favorable flight conditions, the characteristics of tethers be so tailored. In embodiments of multi-tether RCS systems, the aerodynamic characteristics of one or more of the plurality of tethers may differ from one another. Such potentially varying characteristics may include, but are not limited to, the tether's length, shape, and composition.

Figure 4:
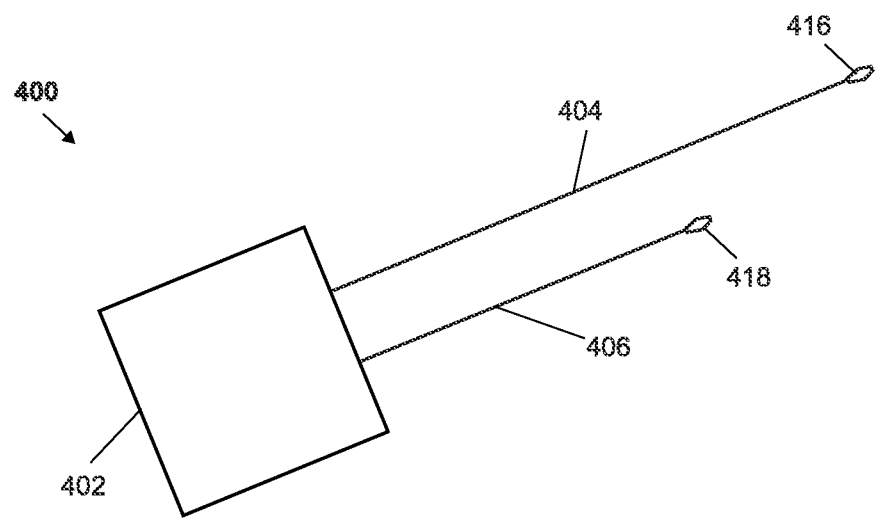
FIG. 4 depicts an exemplary embodiment of a multi-tether RCS system comprising two tethers, each having an aftbody attached to a distal end thereof, wherein each of the tethers comprise different lengths.

FIG. 4 shows an alternate exemplary embodiment of a multi-tether RCS system, system 400, which is similar system 200 of FIG. 2, but which further comprises aftbodies 416 and 418 attached to the distal ends of their respective tethers 404 and 406, opposite forebody 402, and wherein tethers 404 and 406 comprise different lengths (tether 404 being longer than tether 406).

The length of the tether may be chosen so that the tether forces in the translational equations are dominated by the aerodynamic forces on the forebody. In such a case, the system does not have appreciably more drag than the forebody alone. The key is to use the tether to control the pitch angle and thus enable the forebody to generate appreciable lift rather than focusing on just generating increased amounts of drag.

The shape assumed by the tether centerline will have radii of curvature on the order of total length, and this is many orders of magnitude larger than r(s). For flight regimes in which the variations of atmospheric properties over the tether length are small, the equilibrium shape may be simple and relatively insensitive to temporal and spatial variations in atmospheric density. To secure this advantage over all altitude and velocity ranges, the tether length may ideally be just long enough to provide the control force required for the desired trajectory.

Additionally, since the aerodynamics of the aftbodies attached to the tethers affect the drag being exerted on the system, another means for generating a differential tether force using two or more tethers would be to have the aftbodies attached to the tethers possess different aerodynamic characteristics. This may allow for the generation of a differential tether force even if the tether lengths and their offset from the forebody's center of mass are identical. Accordingly, in embodiments, the aerodynamic characteristics of the aftbodies attached to the tether(s) may differ.

Figure 5:
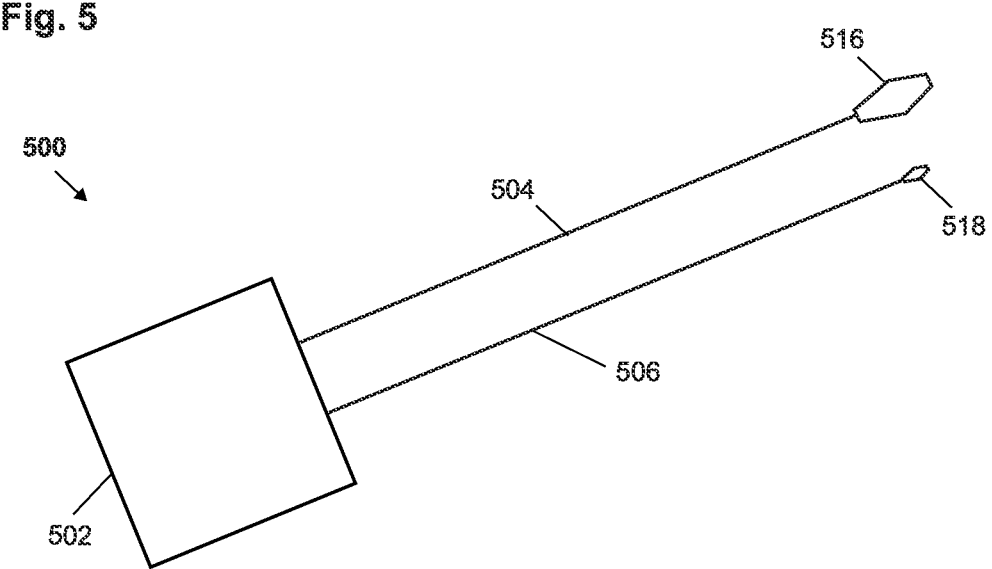
FIG. 5 depicts an exemplary embodiment of a multi-tether RCS system comprising two tethers and an aftbody attached to a distal end of each of said tethers, wherein each of the aftbodies comprise different aerodynamic characteristics.

FIG. 5 shows an alternate exemplary embodiment of a multi-tether RCS system, system 500, which is similar to system 300 of FIG. 3, but wherein aftbodies 516 and 518 attached to distal ends of their respective tethers 504 and 506, opposite forebody 502, comprise different aerodynamic properties, namely size.

The size and aerodynamic characteristics of the aftbodies have considerable impact on the pitch angle of the forebody. This is expected because the characteristics of the aftbody affect the stability of its associated tether. Increasing the drag force generated by a tether and aftbody, such as by making the aftbody larger or less aerodynamically efficient, may provide for increased deceleration due to drag, and may, within limits, assist in providing a moment/torque which can create a suitable change in angle of attack of the forebody. The drag forces generated by the tether and aftbody may be increased or decreased via modification of a number of variables. For example, thicker or longer tethers result in an increase in the rate of descent due to higher drag forces, and larger aftbodies will similarly generate larger drag forces.

Characteristics that may be varied between the aftbodies include, but are not limited to, their size, shape, composition, density, etc.

One of the prominent problems with the configuration of tether-based RCS systems is that of the tether becoming entangled with itself. The problem becomes compounded in the case of multi-tether RCS systems where entangling could also occur between multiple tethers. The more tethers, the longer the tethers, and the closer the tethers' respective attachment points to the forebody are, the higher the risk of entanglement. Several potential remedies to the tether entanglement hazard may be available.

The use of larger aftbodies, or aftbodies having otherwise more suitable aerodynamic characteristics, may decrease the likelihood of tether entanglement by helping to increase the minimum distance between the tethers throughout the reentry process. Additionally, larger aftbodies help to reduce the turbulence and fluttering of the tethers to which they are attached, effectively improving the stability of the tethers and their β tracking performance.

In addition to the use of aftbodies to control tether stability, embodiments may provide for one or more ladder elements, or other similar structures, connecting two or more tethers together at one or more points along their lengths to restrict their motion relative to each other, and thereby reduce the possibility those tethers becoming entangled.

Figure 6:
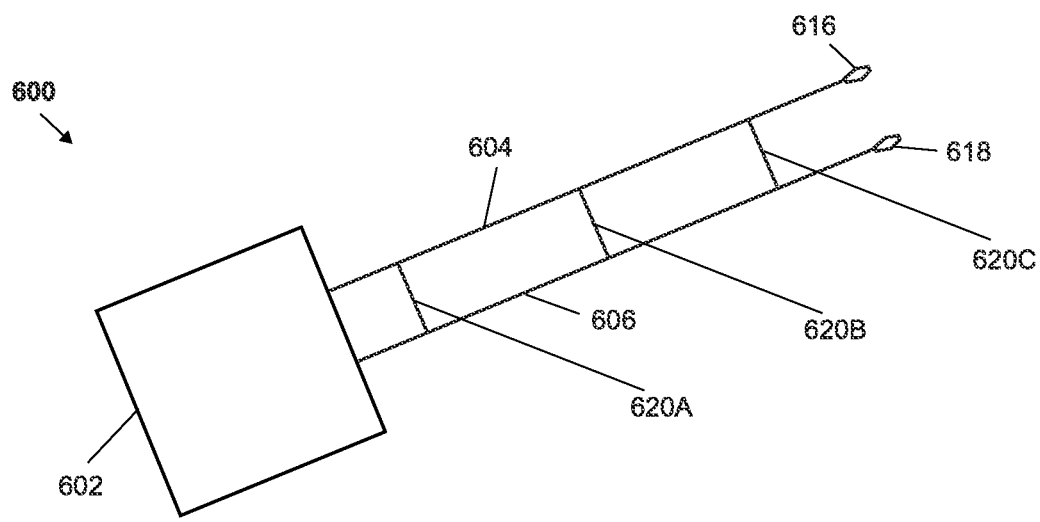
FIG. 6 depicts an exemplary embodiment of a multi-tether RCS system comprising two tethers that are connected at several points along their lengths by a plurality of ladder elements extending therebetween.

FIG. 6 shows an alternate exemplary embodiment of a multi-tether RCS system, system 600, that comprises tethers 604 and 606 of equal length extending between and connecting their respective aftbodies 616 and 618 and forebody 602, and ladder elements 620A, 620B, and 620C each of which being connected to tether 604 at a first end and to tether 606 at a second end and extending between.

In embodiments, such ladder elements may be deformable or stretchable, to allow for the relatively free motion of the tethers to which they are attached, while being resistant to compression, to prevent the tethers from getting close enough together to entangle.

While the use of more tethers may increase their probability of entanglement, as well as the complexity of the system as a whole, it is important to note that any number of tethers may be used together to generate the differential tether force necessary to generate a moment/torque about the system's center of mass, and thereby alter the forebody's angle of attack. Accordingly, embodiments of multi-tether RCS system may comprise more than two tethers.

Figure 7:
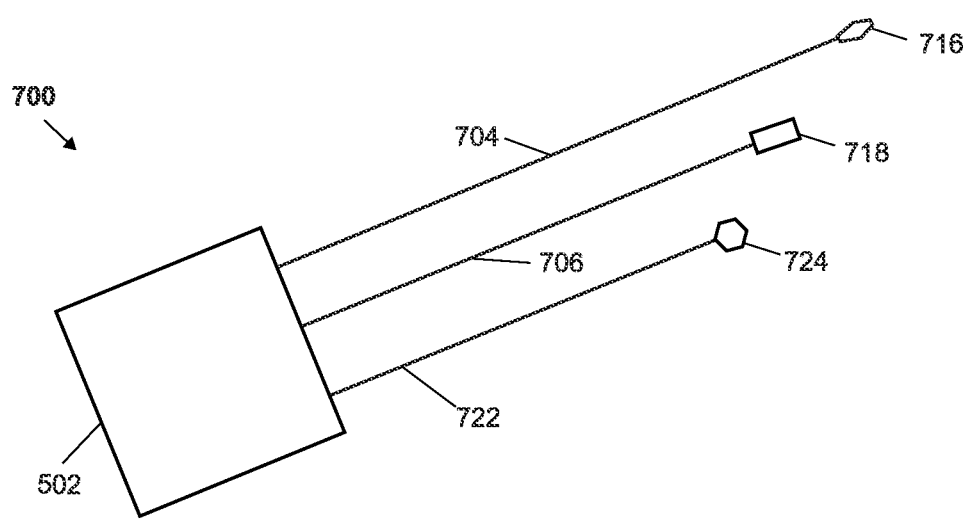
FIG. 7 depicts an exemplary embodiment of a multi-tether RCS system comprising more than two tethers and various exemplary embodiments of aftbodies attached thereto.

FIG. 7 shows an alternate exemplary embodiment of a multi-tether RCS system, system 700 which comprises tethers 704, 706, and 722 extending between and connecting their respective aftbodies 716, 718, and 724 and forebody 702. In the example depicted, each of aftbodies 716, 718, and 724 comprise different aerodynamic properties.

Embodiments of multi-tether RCS systems may comprise any number of tethers as long as together they are able to generate a differential tether force capable of generating a moment/torque about the systems center of mass. Similarly, embodiments of aftbodies comprise various aerodynamic properties so long as they have a lift to drag ration that changes as a function of angle of attack.

It should be understood by those skilled in the art that embodiments of multi-tether RCS systems, may utilize any combination or permutation of design variations discussed above to achieve desired flight characteristics, including optimizing the configuration of the system such that its innate aerodynamic characteristics facilitate the system's reentry without active guidance or control.

Embodiments of multi-tether RCS systems may be uncontrolled (i.e., operate passively rather than by active control). In such embodiments, the aerodynamic properties of the components of the system (the tethers, aftbodies, etc.) may be tailored for a given spacecraft such that, during the reentry process, the RCS system will automatically orient and bias the forebody towards an angle of attack that is favorable for "skipping", or some other desired trajectory, based on the aerodynamic properties of the system alone. Such uncontrolled tether-based systems may provide for certain advantages, including but not limited to, the reduction of the cost, complexity, and weight of the RCS system. For example, such non-actively controlled system may not require the sensors, computers, actuators, etc. required by conventional RCS systems.

While benefits may be derived by using passively controlled multi-tether RCS systems for objects undergoing atmospheric entry, the ability to actively control aspects of such systems may provide for increased efficiency and functionality, including among other benefits, further reducing the thermal and acceleration loading that the system goes through during reentry.

Accordingly, embodiments of multi-tether RCS systems may comprise one or more tether control mechanisms that may be used to actively change one or more characteristics of one or more of the plurality of tethers. Controllable aspects of these tether systems may include, but are not limited to, the tether's length, and the point where the force generated by the tether is functionally transmitted to the forebody (e.g., location of the tether's attachment point relative to the system's center of mass).

If the system includes sensors that can measure altitude and both the horizontal and vertical components of velocity and measure the tether's sag angle, then the system may use such tether control mechanisms to periodically modify the configuration of one or more of the system's tether(s) to control and optimize the trajectory of the system in real time. For example, a tether may be fully deployed when the rate of descent increases and may be retracted when altitude begins to increase. Varying the tether in this manner may assist in encouraging "skipping", which can significantly prolong the entry process.

FIG. 8A depicts an exemplary embodiment of a multi-tether RCS system, system 800 comprising tether control mechanism 826 attached to and between tethers 804 and 806, which are of the same length, and forebody 802, wherein tethers 804 and 806 are each attached to the forebody/tether control mechanism system at their respective tether attachment points 803 and 805, which are each offset from the center of mass of system 800 along at least one axis, here the Y axis, by a first magnitude.

In embodiments, a tether control mechanism may comprise a spooling or winch system that allows for extension and retraction of the tether(s) during the system's atmospheric transit. Such a tether control mechanism may be used to dynamically alter the length of one or more tether(s), affecting the differential tether force generated by the system, which in turn affects the moment/torque operating on the system, thereby facilitating active control the angle of attack of the forebody. The active control facilitated by such a tether control mechanism may be used to optimize the system's trajectory during reentry.

FIG. 8B depicts system 800 of FIG. 8A, wherein at least one of the tethers 804 and 806 has been either extended or retracted from a first length to a second length, via operation of tether control mechanism 826, such tethers 804 and 806 they are no longer of the same length (as they were in the configuration depicted in FIG. 8A).

Alternate embodiments of a tether control mechanism may comprise a motorized actuator connected between the forebody and one or more tether(s), or other suitable system for dynamically altering the attachment point of one or more of the tether(s) to the forebody, in order to dynamically change the moment/torque operating on the forebody due to the drag forces acting on said tether; for example, the pitch angle of the forebody can be controlled to give maximum lift by changing the attachment point as a function of tether sag angle, flight path angle, and pitch rate.

FIG. 8C depicts system 800 of FIG. 8A, wherein tether attachment point 803 has been translated along the +Y axis, via operation of tether control mechanism 826, such that tether attachment point 803 is offset from the center of mass of system 800 along the Y axis by a second magnitude greater than the first magnitude by which attachment point 803 was displaced in FIG. 8A.

Trajectory control is impossible unless the RCS system can be made to produce a non-zero, smoothly varying and predictable tension at the tether attachment point(s). One way to ameliorate this problem is to choose materials that offer diffuse reflection of atmospheric molecules in free molecular flow. In such a case, the magnitude of the aerodynamic force is still proportional to the normal component of stream velocity, but it is also proportional to stream velocity itself, and thus can act in both the normal and tangential directions. Thus, in embodiments, the use of non-metallic tethers, or tethers made of another material that diffusely reflects atmospheric molecules in free molecular flow may be utilized.

While actively controlled RCS systems, which monitor and adapt to changing conditions in real time, tend to provide for the optimum atmospheric transit characteristics they have several drawbacks as well. The ability to monitor ambient conditions requires sensors and processing capability, while the ability to actively modify reaction control characteristics generally requires moving parts. The cost of having these abilities is calculated in additional mass and complexity. Regarding mass, it is generally understood that the ability to get mass into an orbit from the surface of a celestial body is expensive, and even when in space additional mass requires additional thrust (i.e., fuel/resources) to move. Regarding complexity, the more complex a system is and the more moving parts it has, the more points of potential failure there are in the system. Failure in space systems can often lead to catastrophic results. Additionally, the more complex a system is the harder and more expensive it is to create, operate, and maintain.

Embodiments of multi-tether RCS systems incorporating a tether control mechanism configured to alter point where one or more tether(s) imputes its tensional force to the forebody are effectively modifying the length of the lever arm on which the tension force generated by the tether(s) are operating.

As discussed above, by using the tether to generate a drag force and offsetting the tether's drag force from the center of mass of the system, a moment/torque may be induced in the forebody of the system. It should be noted that the location of the attachment points of the plurality of tethers will have an instrumental effect on the differential tether force that they generate, and different arrangements of the plurality of tethers may function more ideally for different atmospheric entry scenarios. The greater the distance between the attachment point of a tether and the system's center of mass the longer the effective lever arm on which that force may act. Accordingly, the greater the tether attachment point's offset from the center of mass, the easier it is to impart a torque to the system, and the smaller the drag forces acting on the tether need to be to generate a suitable moment/torque on the forebody.

Embodiments utilizing a plurality of tethers to generate a differential tether force may have their tether attachment points set in any location suitable such that when under tension they collectively generate a differential tether force that is offset from the center of mass of the system in one or more axes.

To facilitate such an offset in the application of the differential tether force from the system's center of mass, embodiments are envisioned wherein the attachment points of one or more of the plurality of tether to the forebody may be offset from the center of mass of the system in one or more axes. Similarly, embodiments may be configured such that their plurality of tethers have their respective attachment points to the forebody displaced from the forebody's center of mass by different magnitudes.

Generally, the angle of attack of the object going through atmospheric entry will be most impacted by forces acting to control its pitch, and therefore a differential tether force that can impart a torque in the lateral (Y) axis will be most impactful. The configuration of tethers for best allowing for this force generation will likely require their attachment points to be offset from one another along at least this same lateral (Y) axis.

Figure 9:
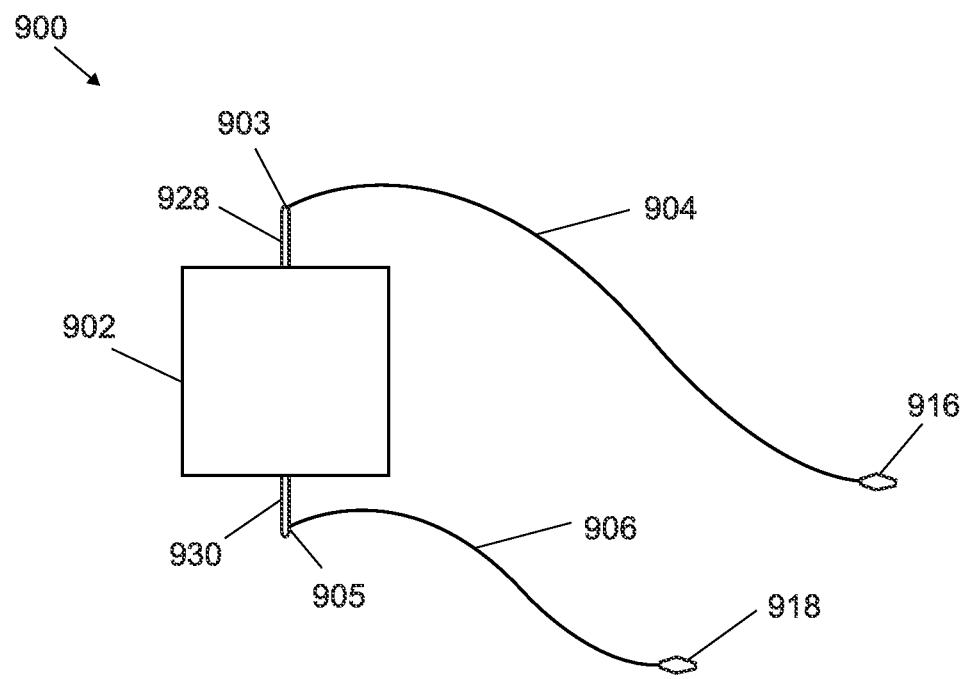
FIG. 9 depicts an exemplary embodiment of a multi-tether RCS system comprising two tethers each attached to a forebody by an associated lever arm extending therebetween, wherein each of the first and second tethers' respective attachment points are offset form the system's center of mass at different points along a first (Y) axis.

FIG. 9 depicts an exemplary embodiment of a multi-tether RCS system, system 900, comprising lever arm 928 attached to forebody 902 at a first end and extending therefrom in the +Y axis, and a lever arm 930 attached to forebody 902 at a first end and extending therefrom in the −Y axis. System 900 further comprises tether 904 connected to lever arm 928 at attachment point 903 opposite forebody 902, and aftbody 916 attached to tether 904 at an end opposite attachment point 903, tether 906 connected to lever arm 930 at attachment point 905 opposite forebody 903, and aftbody 918 attached to tether 906 at an end opposite attachment point 905.

From experimental models assuming the aerodynamic profile of the forebody is such that lift will be generated when the angle of attack is increased in the +Y axes, it appears that there may be a benefit achieved when there is a differential in tether length between the tethers are laterally offset, such that the tether attached at the +Y point is longer than the tether attached at the −Y point. This effect appears to increase as the differential between the lengths of the tethers increases, however there is likely a limit at which the ratio of tether lengths starts becoming too large. The force generated by the longer +Y tether is greater than the tension force generated by the shorter −Y tether, thereby causing the differential tether force to be offset from the forebody's center of mass in the +Y axis. Generating a differential tether force acting on the forebody in the +Y axis causes the forebody to pitch upwards, thereby reducing drag, generating lift, and ideally causing more skips. This configuration appears to assist in the reduction of g-loads and thermal loads experienced by the system even without any active control effort.

Figure 10:
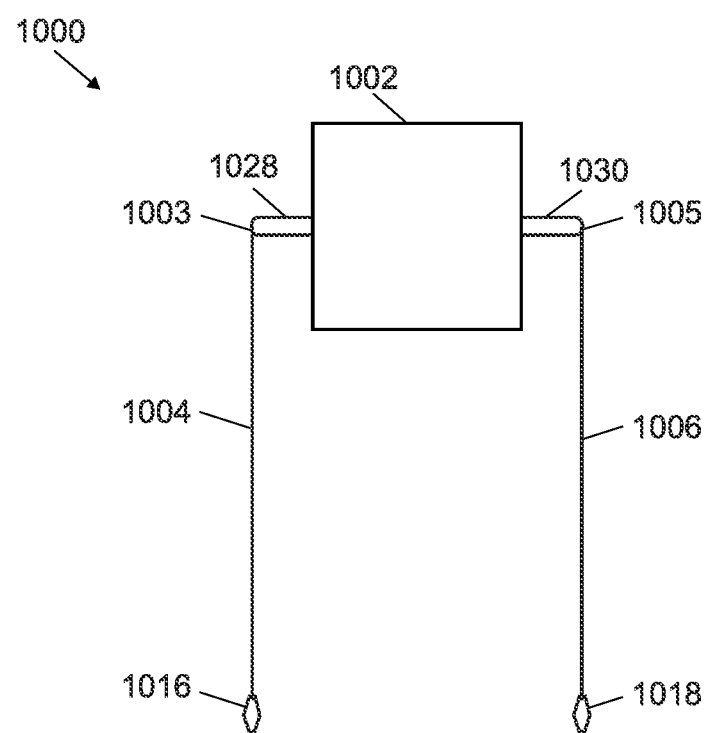
FIG. 10 depicts an exemplary embodiment of a multi-tether RCS system comprising two tethers each attached to a forebody by an associated lever arm extending therebetween, wherein each of the first and second tethers' respective attachment points are offset form the system's center of mass at different points along a second (X) axis.

FIG. 10 depicts an exemplary embodiment of a multi-tether RCS system, system 1000, comprising lever arm 1028 attached to forebody 1002 at a first end and extending therefrom in the +X axis, and a lever arm 1030 attached to forebody 1002 at a first end and extending therefrom in the −X axis. System 1000 further comprises tether 1004 connected to lever arm 1028 at attachment point 1003 opposite forebody 1002, and aftbody 1016 attached to tether 1004 at an end opposite attachment point 1003, tether 1006 connected to lever arm 1030 at attachment point 1005 opposite forebody 1003, and aftbody 1018 attached to tether 1006 at an end opposite attachment point 1005.

Embodiments of multi-tether RCS systems may have the tethers offset in more than one axis.

Figure 11:
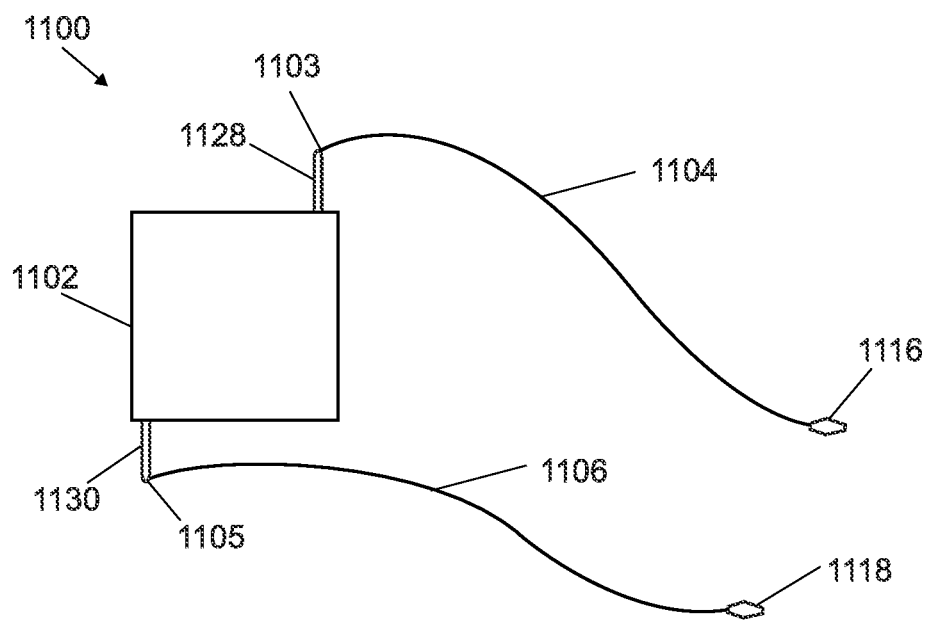
FIG. 11 depicts an exemplary embodiment of a multi-tether RCS system comprising two tethers each attached to a forebody by an associated lever arm extending therebetween, wherein each of the first and second tethers' respective attachment points are offset form the system's center of mass at different points along both a first (Y) and a second (X) axes.

FIG. 11 depicts an exemplary embodiment of a multi-tether RCS system, system 1100 which comprises lever arm 1128 attached to forebody 1102 at a first end and extending therefrom in the −X and +Y axes, and lever arm 1130 attached to forebody 1102 at a first end and extending therefrom in the +X and −Y axes. System 1100 further comprises tether 1104 connected to lever arm 1128 at attachment point 1103, and aftbody 1116 attached to tether 1104 at an end opposite attachment point 1103, tether 1106 connected to the lever arm 1130 at attachment point 1105, and aftbody 1118 attached to tether 1106 at an end opposite attachment point 1105.

Figure 12:
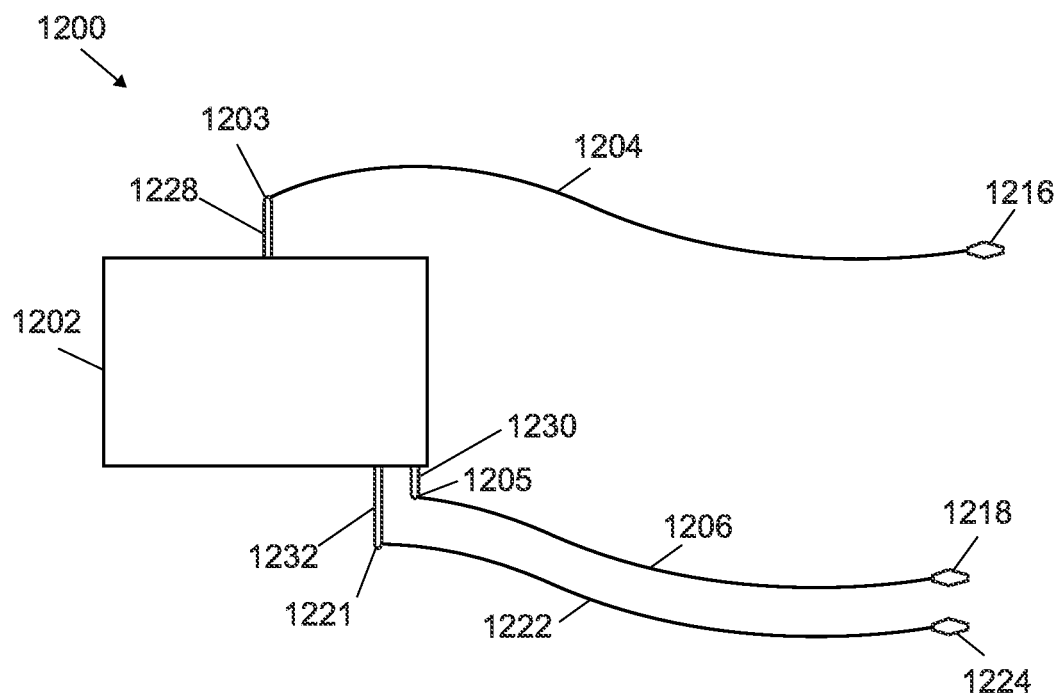
FIG. 12 depicts an exemplary embodiment of a multi-tether RCS system comprising three tethers, each attached to a forebody by an associated lever arm extending therebetween, wherein the first tether's attachment point is offset from the system's center of mass along a first (Y) axis, while each of the second and third tethers' attachment points are offset form the system's center of mass along each of a first (Y), a second (X), and a third (Z) axes.

FIG. 12 depicts an exemplary embodiment of a multi-tether RCS system, system 1200 which comprises lever arm 1228 attached to forebody 1202 at a first end and extending therefrom in the +Y axis; lever arm 1230 attached to forebody 1202 at a first end and extending therefrom in the −X, −Y, and −Z axes; and lever arm 1232 attached to forebody 1202 at a first end and extending the reform in the −X, −Y, and −Z axes. System 1200 further comprises tether 1204 connected to lever arm 1228 at attachment point 1203, aftbody 1216 attached to tether 1204 at an end opposite attachment point 1203, tether 1206 connected to the lever arm 1230 at attachment point 1205, aftbody 1218 attached to tether 1206 at an end opposite attachment point 1205, tether 1222 connected to lever arm 1232 at attachment point 1221, and aftbody 1224 attached to tether 1222 at an end opposite attachment point 1221.

Mathematical models have shown that benefits may be achieved by using embodiments wherein one tether offset from the system's center of mass in the −Y axis and another tether offset in both the +X and +Y axes. Lifting torque (in pitch direction) on a forebody can be generated by differential force along +Y, −Y as well as +X, −X. The additional axis of offset may allow for a greater distance between the attachment points of the tethers to be achieved, thereby reducing the likelihood of entanglement. Such models also suggest that embodiments comparison a +XY, −Y configuration may result in less oscillatory behavior. Other tests indicate multi-tether RCS system with tether offset in +XY, −Y configurations may provide for optimal skipping behavior and g-load reduction. It should also be noted that embodiments having an +XY, −Y configuration were generally found to perform better than either +Y, −Y or +X, −X configurations.

The offset of a tether's point of attachment to the forebody from the system's center of mass, like tether length, aftbody size, number of tethers, etc. is one of the many parameters that may be tailored across embodiments of multi-tether RCS system to provide for preferred flight conditions. In embodiments, said offset parameter may be actively controlled by way of a tether control mechanism, as discussed above.

Graphs comparing suborbital reentry of an exemplary embodiment of a two-tether RCS system comprising a chevron-shaped forebody made of nickel, with dimensions of (2 m, 0.12 m, 0.66 m), and a mass of 200 kg, a first tether having a length of 10 m and a radius of 0.025 m that is offset form the system's center of mass by 1 m in the +Y axis, and a second tether having a length of 1 m and a radius of 0.025 m that is offset form the system's center of mass by 1 m in the −Y axis, compared against a spacecraft having properties identical to those of multi-tether RCS system's forebody and no RCS may be seen in FIGS. 13A-D.

Figure 13A:
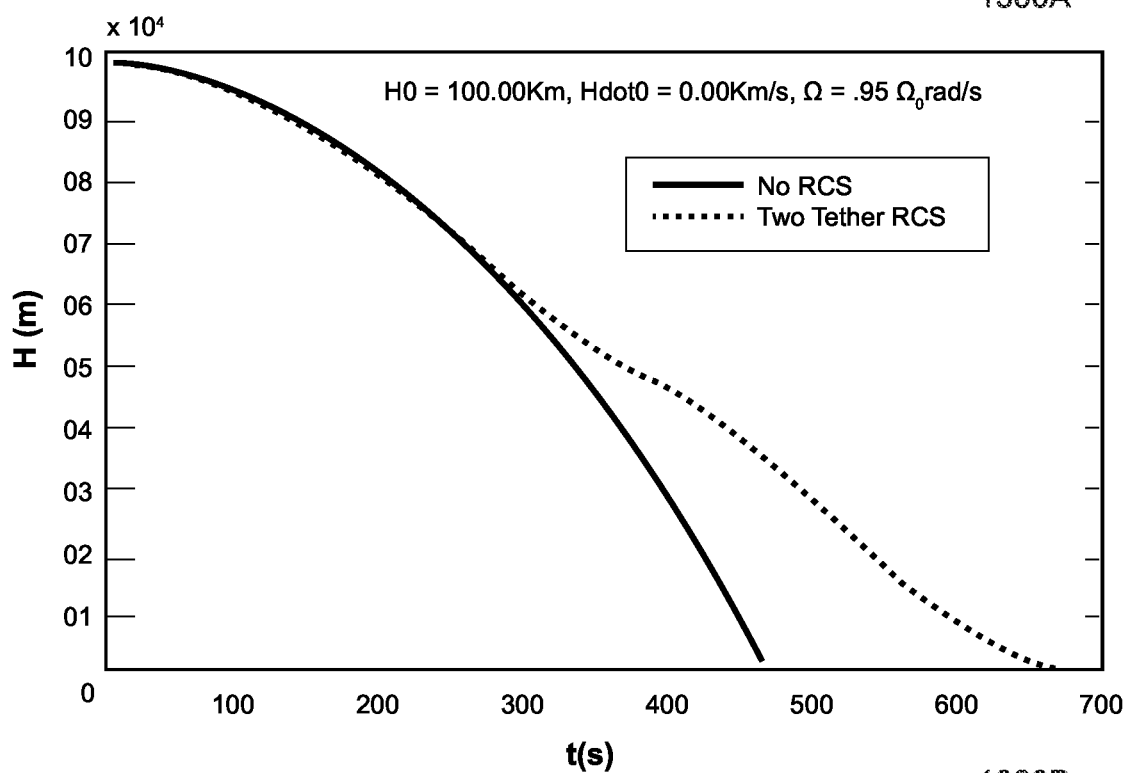
FIG. 13A depicts a graph showing altitude vs time for the suborbital reentry of an exemplary embodiment of a multi-tether RCS system compared against a spacecraft having properties identical to those of multi-tether RCS system's forebody and no RCS.

FIG. 13A shows graph 1300A, which depicts altitude vs time during suborbital reentry of an exemplary embodiment two-tether RCS system compared against a spacecraft having properties identical to those of multi-tether RCS system's forebody and no RCS.

Graph 1300A shows how a multi-tether RCS system may provide for a reentry flight profile that increases the period of time over which the system altitude is lost, as compared to a system with no RCS. Further, the slight wiggle present in the line representing the multi-tether RCS system in graph 1300A represents the system experiencing a change in lift resulting from the RCS system's effect on its angle of attack.

Figure 13B:
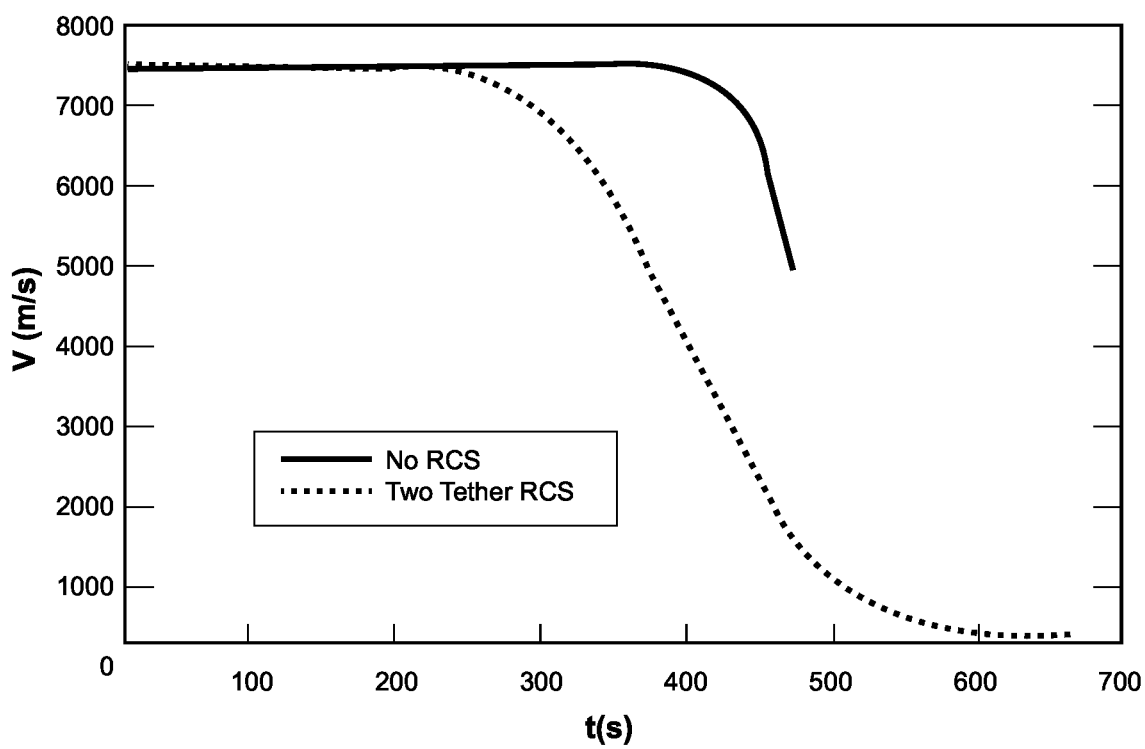
FIG. 13B depicts a graph showing velocity vs time for the suborbital reentry of the systems detailed above in reference to FIG. 13A.

FIG. 13B shows graph 1300B, which depicts velocity vs time during suborbital reentry of an exemplary embodiment two-tether RCS system compared against a spacecraft having properties identical to those of multi-tether RCS system's forebody and no RCS.

Graph 1300B shows how a multi-tether RCS system may provide for the system's velocity, like its altitude, to be reduced more gradually and over a longer period of time than the system without any RCS.

Figure 13C:
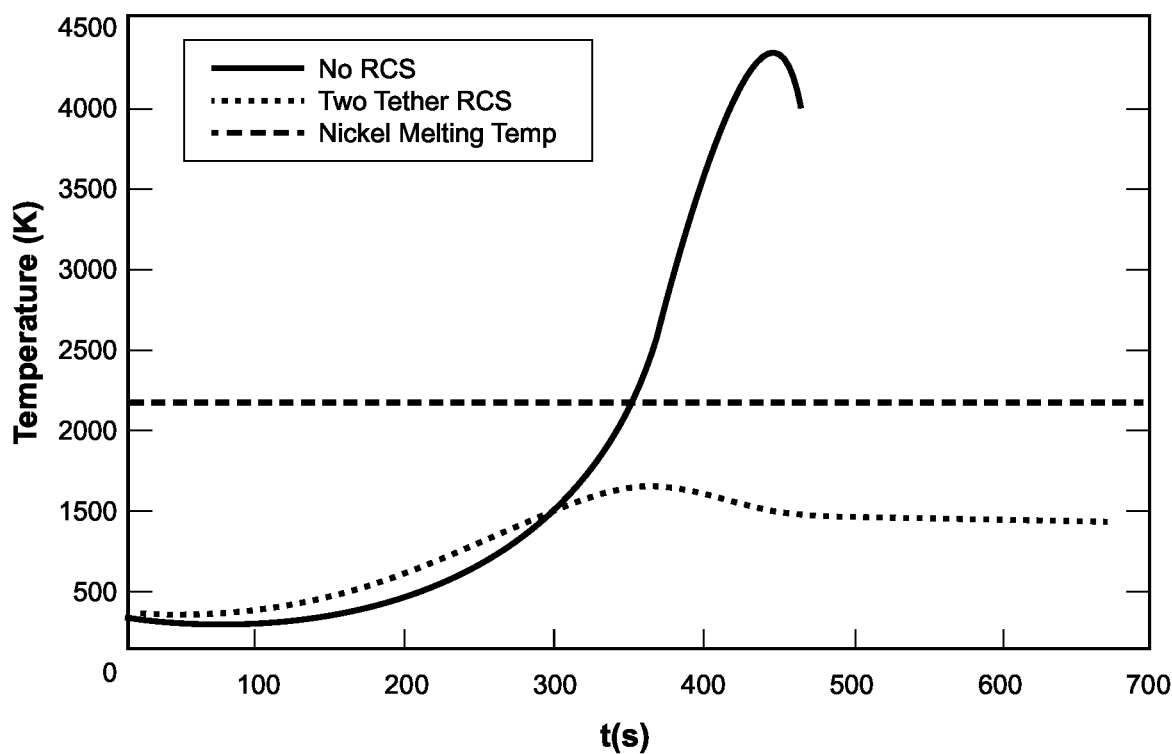
FIG. 13C depicts a graph showing forebody temperature vs time for the suborbital reentry of the systems detailed above in reference to FIG. 13A.

FIG. 13C shows graph 1300C, which depicts forebody temperature vs time during suborbital reentry of an exemplary embodiment two-tether RCS system compared against a spacecraft having properties identical to those of multi-tether RCS system's forebody and no RCS.

Graph 1300C shows how a multi-tether RCS system may enable a drastic reduction of forebody heating during the reentry process as compared to similar systems without an RCS.

Figure 13D:
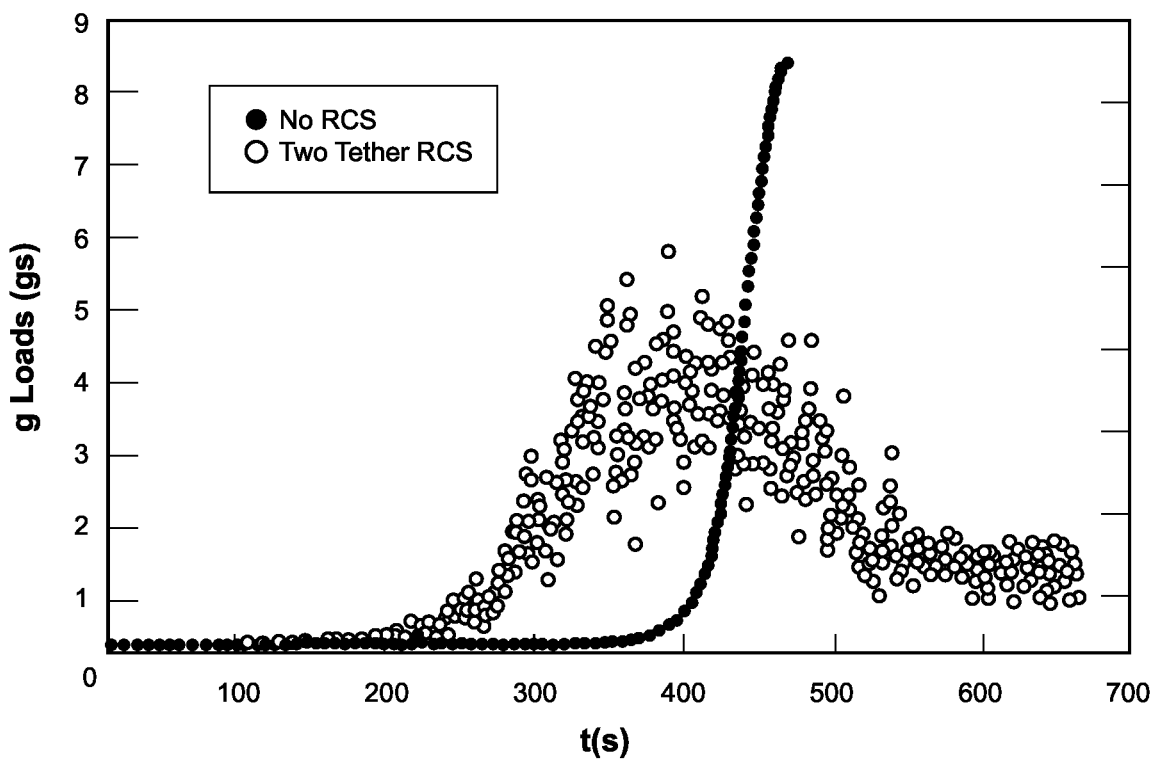
FIG. 13D depicts a graph showing forebody g-load vs time for the suborbital reentry of the systems detailed above in reference to FIG. 13A.

FIG. 13D shows graph 1300D, which depicts forebody g-load vs time during suborbital reentry of an exemplary embodiment two-tether RCS system compared against a spacecraft having properties identical to those of multi-tether RCS system's forebody and no RCS.

Graph 1300C shows how a multi-tether RCS system may help to drastically reduce the g-loads experienced by the forebody of a system during the reentry process.

Figure 14A:
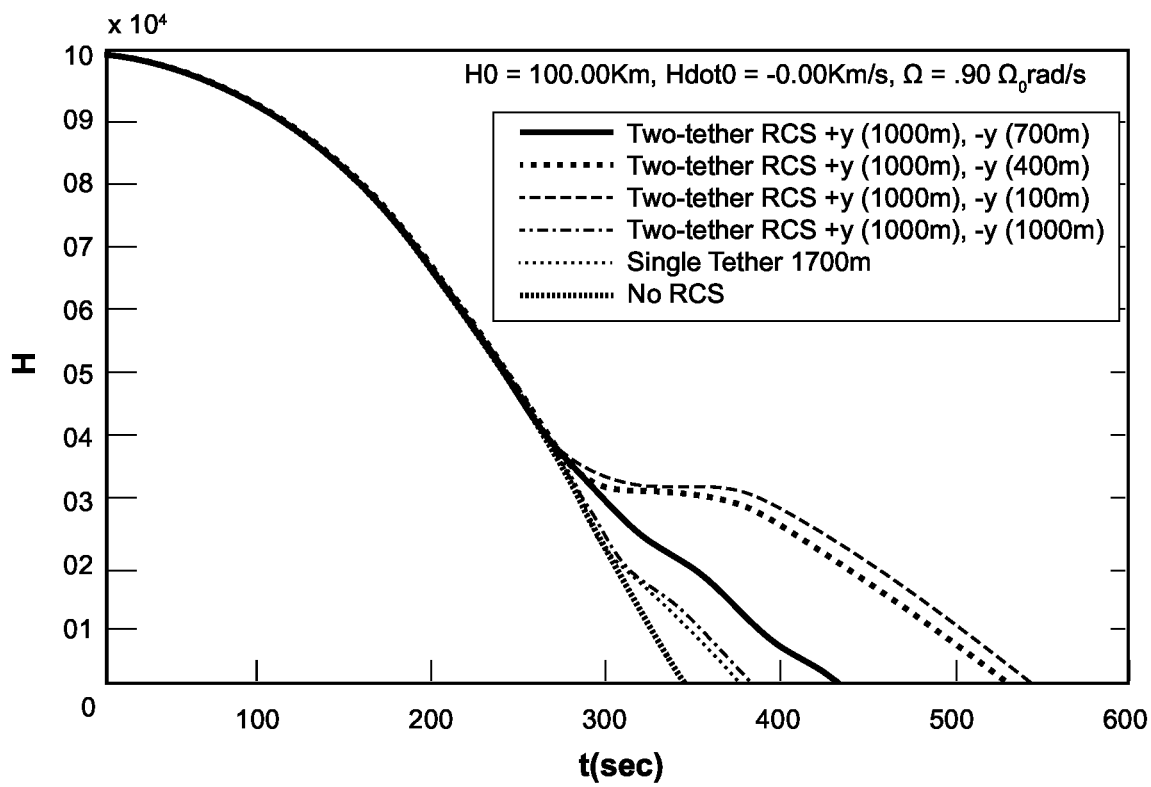
FIG. 14A depicts a graph showing altitude vs time for the suborbital reentry of a plurality of spacecraft having various tether-based RCS systems, including multiple exemplary embodiments of multi-tether RCS systems, each of which comprises an identical forebody and a first tether of a consistent length offset from the system's center of mass in the +Y axis, and which each comprise a second tether, offset from the system center of mass in the −Y axis, each of said second tether comprising a length different from that of the second tether of each of the other multi-tether RCS system embodiments.

FIG. 14A shows graph 1400A, which depicts altitude vs time for the suborbital reentry of a plurality of spacecraft having various tether-based RCS systems, including multiple exemplary embodiments of multi-tether RCS systems, each of which comprises an identical forebody and a first tether having a length of 1,000 m offset from the system's center of mass in the +Y axis, and which each comprise a second tether, offset from the system center of mass in the −Y axis, each of said second tethers comprising a length different from that of the second tether of each of the other multi-tether RCS system embodiments.

Figure 14B:
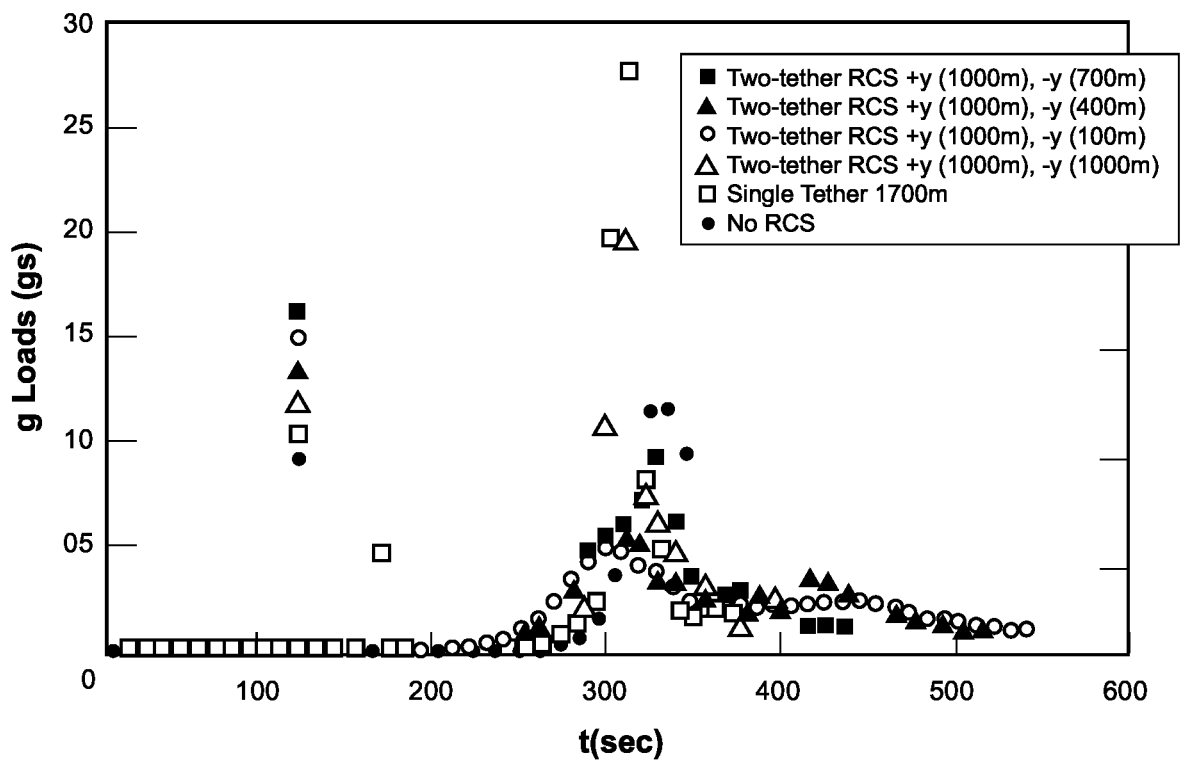
FIG. 14B depicts a graph showing forebody g-load vs time for the suborbital reentry of the systems detailed above in reference to FIG. 14A.

FIG. 14B shows graph 1400B, which depicts forebody g-load vs time for the suborbital reentry of the systems detailed above in reference to FIG. 14A.

As can be seen by the graphs discussed above, embodiments of multi-tether RCS systems may provide for many benefits over other methods known in the art, including reducing the thermal and acceleration loads the system experiences during reentry. Such benefits of various embodiments of multi-tether RCS systems and methods of their use may be enjoyed across a multitude of potential use cases, including those involving various forms of spacecraft/forebody.

Figure 15:
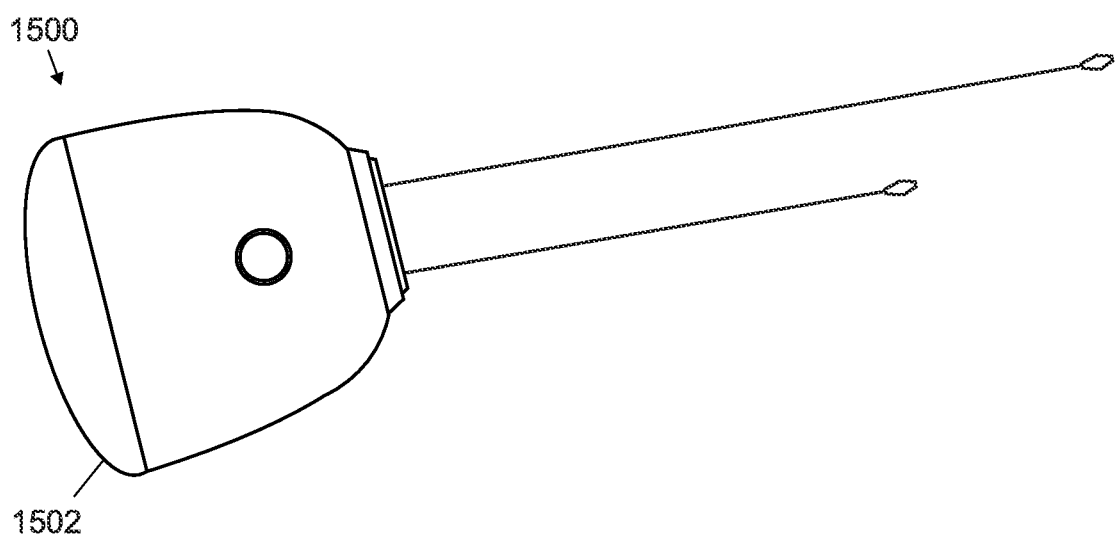
FIG. 15 depicts an exemplary embodiment of a multi-tether RCS system wherein the spacecraft/forebody comprises a capsule.

While the previous FIGS. depict the spacecraft/forebody in an intentionally generic and simple manner, it should be understood that systems and methods contemplated herein include those comprising any spacecraft/forebody, including but not limited to a capsule, a space shuttle, a space plane, a satellite, a space suit, a rocket engine or stage thereof, an ore body produced by space mining, a meteor, space debris, etc., FIG. 15 shows an exemplary embodiment of a multi-tether RCS system, system 1500, wherein the forebody comprises capsule 1502.

Space capsules may utilize embodiments of multi-tether RCS systems to gently transport fragile payloads, including but not limited to humans or protein crystals, from space to the surface of the Earth. Such fragile payloads may benefit from the reduced g-loading that use of a multi-tether RCS system may provide.

Embodiments of multi-tether RCS system may also potentially be applied at smaller scales, for example, multi-tether RCS systems may be integrated into spacesuits to provide astronauts with the ability to survive the process of reentry, even when done individually and with without the need of more complicated or expensive hardware. Such embodiments may, for example, be useful for emergency situations when an astronaut is forced to abandon, or otherwise become separated from their vessel.

Figure 16:
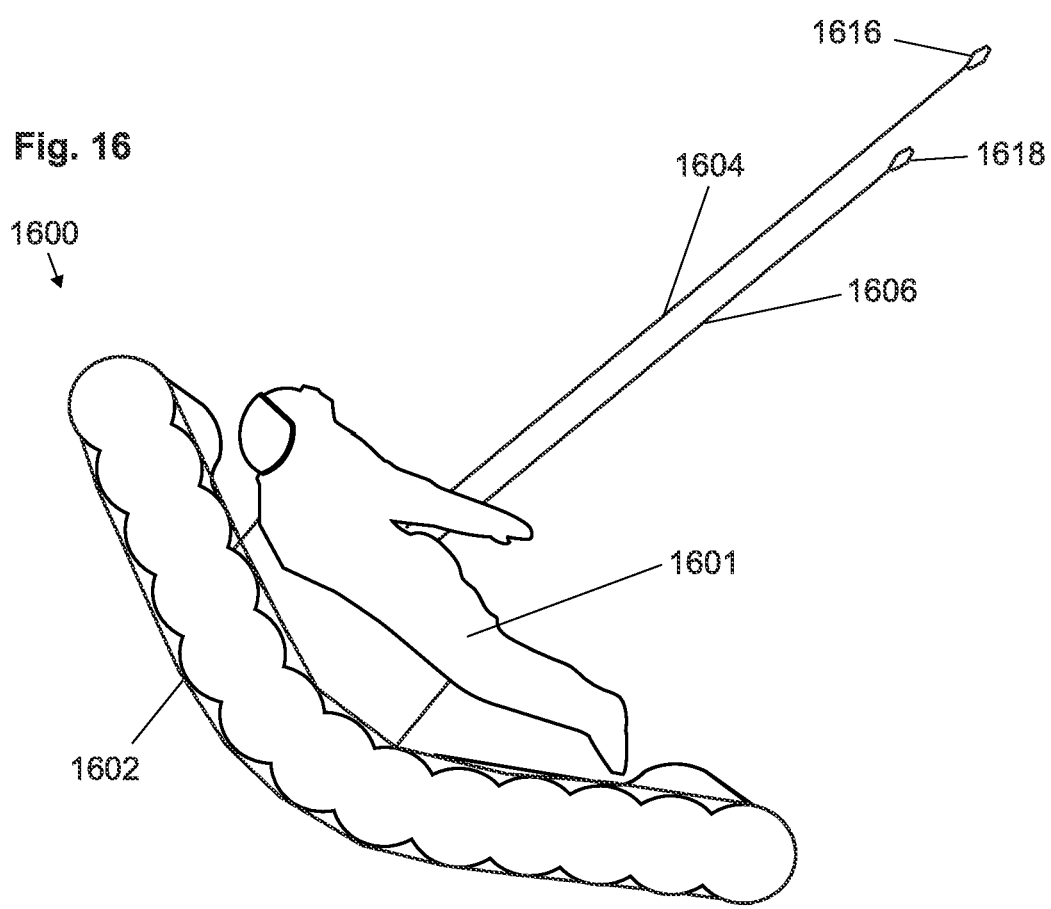
FIG. 16 depicts an exemplary embodiment of a multi-tether RCS system wherein the spacecraft/forebody comprises an astronaut in a spacesuit and a heatshield.

FIG. 16 shows an exemplary embodiment of a multi-tether RCS system, system 1600 wherein the forebody comprises heatshield 1602, and further comprises space suite 1601.

In such embodiments, an astronaut in spacesuit 1601 may exit, or otherwise be separated from a spacecraft, and begin falling towards a celestial body having an atmosphere. As the astronaut is falling, they may deploy a plurality of tethers from spacesuit 1601, which may or may not have aftbodies attached to their respective distal ends (here tethers 1604 and 1606 with aftbodies 1616 and 1618, respectively). As they accelerate downwards into the atmosphere, the astronaut may deploy heatshield 1602 and may place heatshield 1602 generally between themselves and the direction of their velocity relative to the atmosphere to protect them from heat generated by friction with the atmosphere. As the astronaut descends through the atmosphere, the system 1600 may either passively or dynamically alter its angle of attack to reduce the thermal and acceleration loads that the system experiences throughout its atmospheric transit. Once the astronaut slows to a speed at which the atmospheric friction is no longer going to generate more heat than space suit 1601 can handle, the astronaut may discard heatshield 1602. The astronaut may then continue to use the multi-tether RCS system to manage their descent, now with spacesuit 1601 operating as the primary aerodynamic portion of the system (i.e., the forebody), as if they were skydiving. Once the astronaut has reached a predetermined altitude and/or velocity, or responsive to an action by the astronaut, they may deploy one or more conventional declaration means, such as one or more parachute(s), inflatable cushions, or other such means known in the art, which may be used for the final portion of the systems descent through the atmosphere, to the surface of the celestial body.

Figure 17:
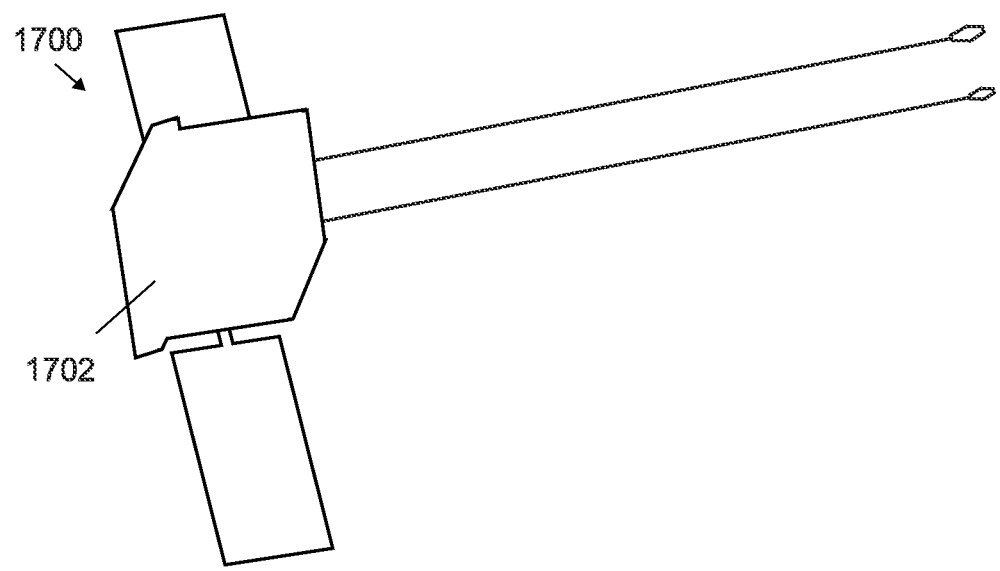
FIG. 17 depicts an exemplary embodiment of a multi-tether RCS system wherein the spacecraft/forebody comprises a satellite.

FIG. 17 shows an exemplary embodiment of a multi-tether RCS system, system 1700, wherein the forebody comprises satellite 1702.

The space around the Earth is littered with hundreds of satellites, many of which are no longer operating, and thousands of pieces of space debris that could cause damage if permitted to reenter Earth's atmosphere in an uncontrolled manner. Accordingly, embodiment of a multi-tether RCS systems may be used to controllably de-orbit objects like decommissioned satellites and other space debris.

Figure 18:
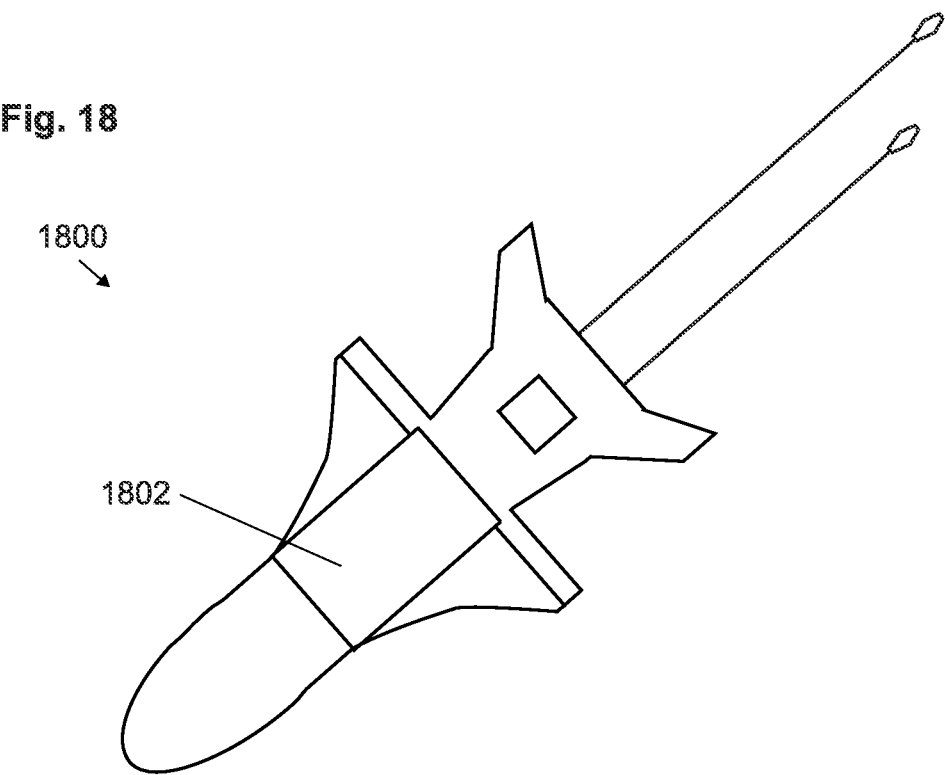
FIG. 18 depicts an exemplary embodiment of a multi-tether RCS system wherein the spacecraft/forebody comprises a rocket engine or a stage thereof.

FIG. 18 shows an exemplary embodiment of a multi-tether RCS system, system 1800, wherein the forebody comprises rocket engine 1802.

The reusability of spacecraft infrastructure is a key factor in reducing the cost of accessing space. Building complicated aerospace systems, like rocket engines, is incredibly expensive. Many launch vehicles known in the art are single-use, meaning that after they are used a single time they are discarded and never used again. Knowing this, many organizations are now building launch vehicles that are designed to be recovered, refurbished, refilled, and reused. By doing this, such organizations can drastically reduce the average cost of launching material to space.

In embodiments, a multi-tether RCS system may be included on a launch vehicle, such as a rocket engine, or stage thereof, and may be deployed after the fuel in the engine has been expended and the engine has been decoupled from the rest of the spacecraft. The multi-tether RCS system may be used to either actively or passively control the engine trajectory as it falls back to the Earth's surface.

Such multi-tether RCS system used in this manner may be preferred over systems and methods known in the prior art, as they are less complicated than the retrorocket-based RCS systems utilized in modern vertical takeoff, vertical landing rocket engines, like the first stage of SpaceX's Falcon 9; and can provide for more accurate and softer atmospheric transit and landing than the parachute-only facilitated return of the space shuttle's solid rocket boosters, which may result in reduced wear-and-tear and associated inspection and refurbishment costs.

Figure 19:
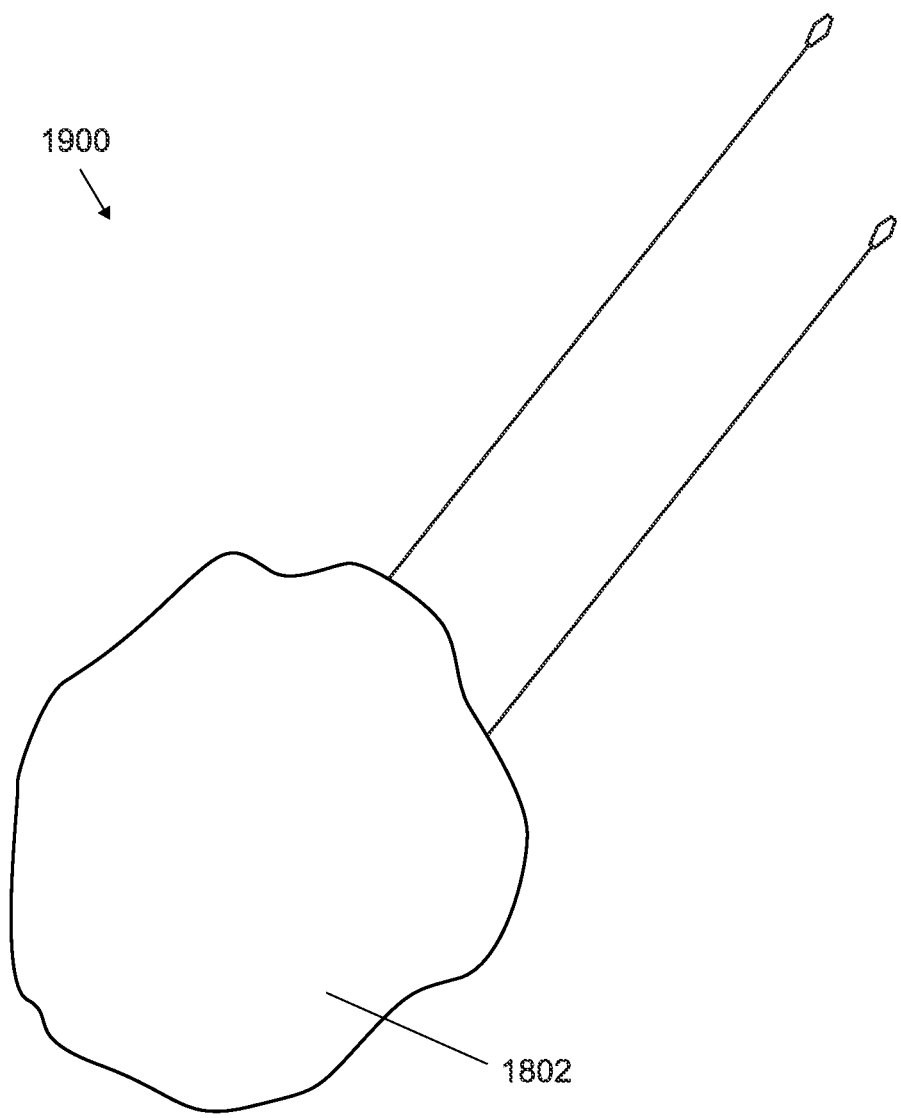
FIG. 19 depicts an exemplary embodiment of a multi-tether RCS system wherein the spacecraft/forebody comprises an orebody.

FIG. 19 shows an exemplary embodiment of a multi-tether RCS system, system 1900, wherein the forebody comprises an orebody 1902.

Multi-tether RCS system may be used to deorbit asteroids or orebodies mined in space and guide them to impact a particular location on the surface of the Earth. After its landing the orebody may be mined in a conventional manner.

In embodiments, an orebody or other spacecraft may use a multi-tether RCS system to operate as a ballistic weapon. In such embodiments, the RCS system may be used to control the atmospheric transit of such a weapon such that it impacts a target location while traveling at a speed sufficient for the spacecraft to damage or destroy the target.

In embodiments, a multi-tether RCS system may comprise a conventional or nuclear weapon. In such embodiments, the multi-tether RCS system may be configured such that it may be used to control the atmospheric transit of such a weapon such that it impacts a desired location on the surface of the Earth. If the spacecraft comprises such a weapon, it may be detonated when it impacts the surface of the planet, or once it reaches a predetermined altitude or location.

An interesting observation from the examination of multi-tether RCS systems is that there is only the need for a differential force to be generated by the tethers to reorient and change the pitch angle of the system's forebody. This means that there is no specific need for the individual forces of the multi-tethers to be high. Accordingly, the tethers do not necessarily need to generate large amounts of drag individually if there is a sufficient differential tether force to impart a moment/torque on the forebody. This suggests that the tethers in these embodiments need not be particularly long if the number of tethers, the aerodynamic characteristics of their respective aftbodies are such that they provide for a suitable differential tether force therebetween.

Experimental models of multi-tether RCS systems indicate that there may be significant benefit resulting from the reduction of the length of one or more of the tethers in a multi-tether system. The shorter the tethers, and the larger the relative distance between the tether attachment points, and the less likely the tethers are to entangle with one another. Additionally, the shorter the tether the less likely it is to entangle with itself. A problem with the use of short tether(s) is that as the length of the tether(s) are reduced their stability reduces as well. This issue with stability may be ameliorated through the use of larger aftbodies. However, while an increase in size of the aftbody assists with stabilization of the tether, if the aftbody is increased in size too much the g-loads experienced by the system during reentry may be increased. This g-loads increase appears to be due to the increased drag force resulting from the larger aftbody, which results in the body entering the atmosphere sooner. As a result, the forebody experiences higher peak H which results in higher peak g-load. Therefore, there should be a point of inflection that corresponds to an ideal aftbody size, which provides sufficient stabilization of the tether while not increasing drag so much as to negatively affect the g-loading of the system during atmospheric transit.

The most fragile component of the system is likely to be the tether itself. If the tether survives the aerodynamic heating and tensional forces acting on it during atmospheric entry, it is highly likely that so will the forebody. Models of heating and breakage conditions show that a long tether can experience extreme heating rate gradients and frequent breakage near the free end, thus necessitating the use of a shorter tether. A shorter tether may also be less sensitive to varying atmospheric conditions with altitude since it will "sample" variations over a smaller altitude range. Additionally, a shorter tether, by reducing the spatial dependence of the density will render the dynamics more predictable. Finally, a shorter tether will require the use of less mass than a longer tether of the same material.

It is also noted that for a constant pull force, the amount of elongation experienced by a shorter tether will be more than the longer tether. The reason is that the force is distributed over a longer length. Accordingly, it is important that systems utilizing shorter tethers and larger aftbodies take care so that the force acting on the aftbody does not exceed the breaking point of the short tether.

The use of the tether-based systems disclosed hereinabove need not be limited to reaction control during atmospheric entry. The aspects of the present disclosure can be used by a spacecraft for reducing the energy of and circularizing deep space trajectories, highly elliptical orbits, and generally any trajectory or orbit that is more energetic than low Earth orbit.

A tether-based system may be utilized to reduce the orbital energy of a spacecraft in a high-energy orbit around a celestial body having an atmosphere, over the course of successive orbits. Such high-energy orbits may include hyperbolic and highly elliptical orbits. One or more tethers may be deployed from a spacecraft and run through an atmosphere of a celestial body to generate drag, which will bleed energy out of the orbit of the spacecraft. This orbital energy loss will cause the apogee and eccentricity of the orbit to decrease after each pass of the celestial body having an atmosphere, while the perigee of the orbit remains substantially the same. This process allows for a high-energy orbit to be transitioned to a low energy orbit, such as a circular orbit, over the course of successive orbits without the use of consumable fuels.

Figure 20:
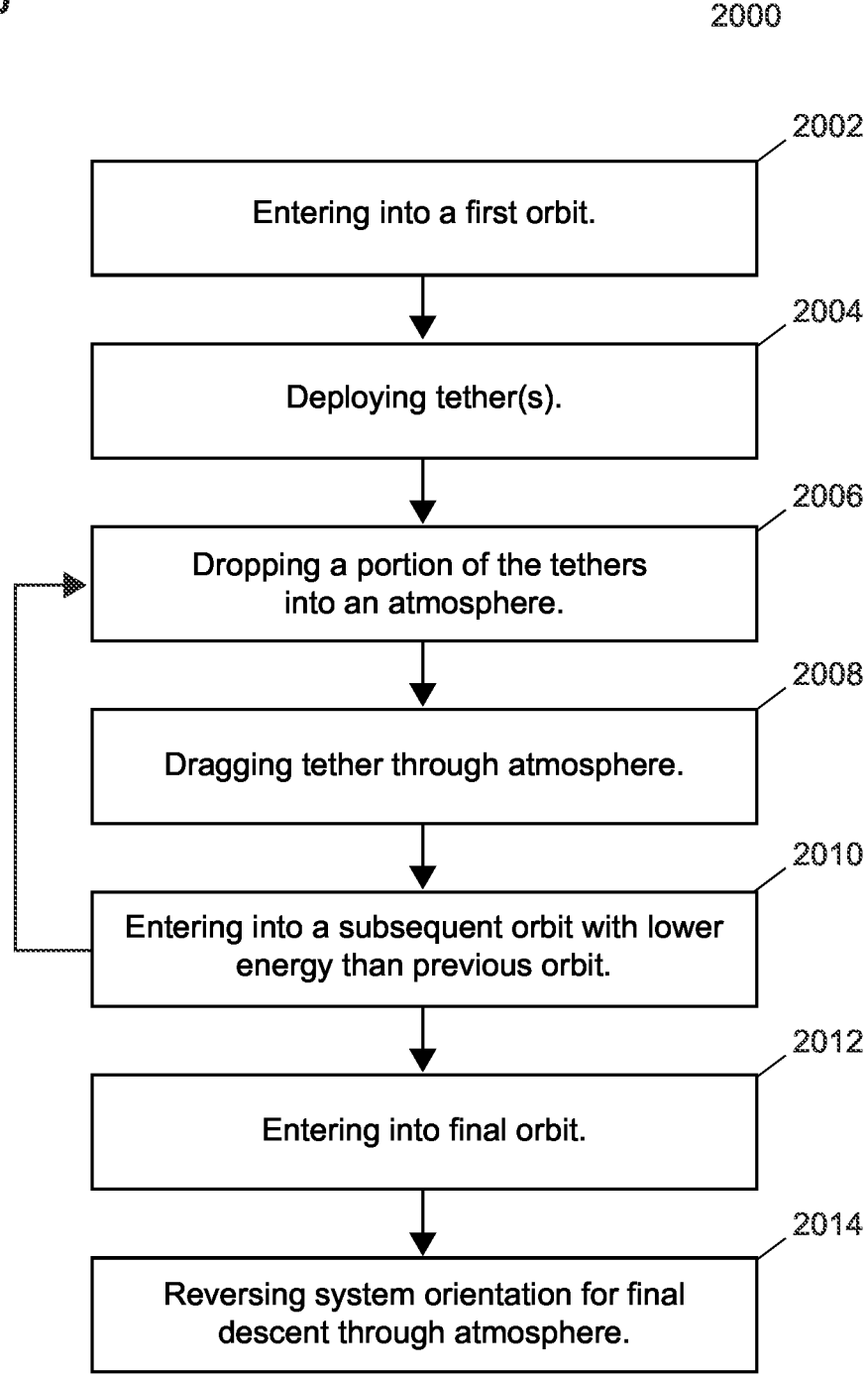
FIG. 20 depicts a flowchart detailing an exemplary embodiment of a method of orbital energy reduction.

FIG. 20 depicts a flowchart of an exemplary method of orbital energy reduction using a tether-based RCS system, method 2000. Method 2000 may comprise: step 2002 in which a spacecraft enters into a first orbit about a celestial body having an atmosphere; step 2004 wherein one or more a tethers are deployed from the spacecraft; step 2006 wherein a portion of said tether(s) are inserted into the atmosphere surrounding the celestial body; step 2008 wherein a portion of the tether(s) physically interact with the atmosphere, resulting in drag, which in turn is imparted to the spacecraft; and step 2010 wherein the spacecraft loses orbital energy due to said drag generated by said frictional interaction between the tether and the atmosphere, causing the spacecraft to enter into an orbit with a lower orbital energy than the first orbit. Embodiments of method 2000 may provide for steps 2006, 2008, and 2010 to be iterated in a loop until an orbit with a desirable orbital energy is obtained.

Embodiments of method 400 may further comprise step 2012 wherein the spacecraft enters an orbit at which point further reduction in orbital energy would result in gravitational capture of the spacecraft by the celestial body (the "final" orbit).

The final orbit, before final entry of the atmosphere (the orbit during which the differential tether force should flip), may be calculated by observation of the altitude of the orbit relative to the altitude of perigee, by comparison of the velocity of the orbiting object relative to the escape velocity of the celestial body, or by other such known means.

Embodiments of method 2000 may be utilized by systems using a plurality tethers, as discussed hereinabove. In such embodiments, method 2000 may additionally comprise step 2014, wherein after step 2012 during which the spacecraft enters its final orbit, the orientation of the spacecraft is reversed.

Unlike the orbital reentry as discussed hereinabove, the objective of the orbital energy reduction system is to reduce the velocity to the best extent possible so that it reduces to a value comparable to orbital entry. This means that the forebody needs to "pitch down" (i.e., alter its angle of attack/pitch angle in the −Y, towards the celestial body) to best generate drag rather than lift, as is discussed in the preceding paragraphs, where the system is designed to "pitch up" (i.e., alter its angle of attack/pitch angle in the +Y, away from the celestial body) and generate lift in order to glide or skip through the atmosphere. Accordingly, in such orbital energy reduction systems, the tether-based system is operated in a configuration opposite to that discussed above with regard to the tether-based RCS system for atmospheric reentry, in that the tether system is arranged such that the differential tether force generates a moment/torque that causes the angle of attack of the forebody to reduce the amount of lift and increase the amount of drag acting on the system.

An effect of bleeding energy from an orbit in this manner is that, as the system's orbital energy is lost due to frictional interaction with the atmosphere of the celestial body during each successive orbital pass, the apogee of the orbit decreases monotonically while its perigee remains substantially similar to that of the initial orbit. This means that the method discussed herein may provide for a means to convert a highly elliptical or hyperbolic orbit into a low energy, or even circular, orbit over time without the consumption of resources.

Obviously, the pitch down strategy does not work well for final orbit when the orbit decays enough for the system to undergo atmospheric entry rather than another orbit. For the final orbit, it makes sense to abandon the "pitch down" tether configuration and assume the regular "pitch up" tether configuration which may operate to attenuate the spacecraft's reduction in velocity during its atmospheric transit, thus reducing the thermal and acceleration loads that the spacecraft experiences during reentry, as discussed in detail hereinabove. It should be noted that once the "pitch up" configuration is engaged after the final orbit, the forebody might have enough energy to do large skips, be kicked back out of the atmosphere into further orbits, or even reach an escape trajectory before reentry is completed.

Figure 21:
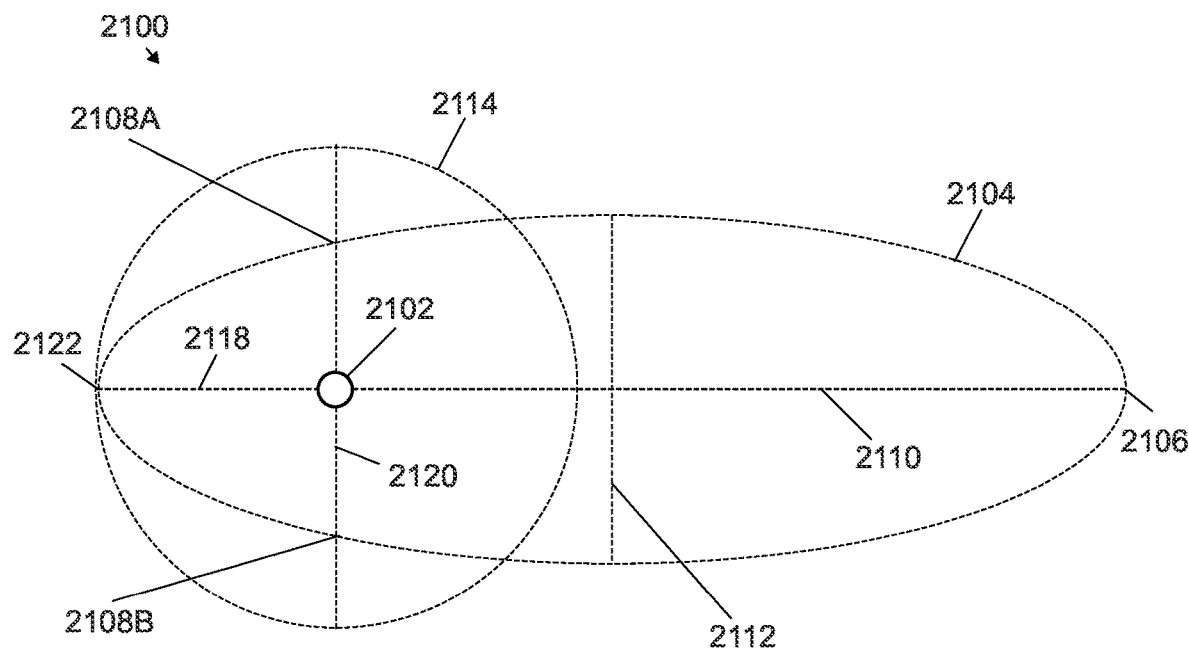
FIG. 21 depicts an exemplary high-energy, elliptical, orbit and an exemplary low-energy, circular, orbit; said orbits having a common crossing point that is also the periapsis of the elliptical orbit.

FIG. 21 depicts a set of exemplary orbits, orbits 2104 and 2114, about celestial body 2102. Orbit 2104 is a highly eccentric (high energy) orbit while orbit 2114 is relatively circular and low energy. High energy orbit 2104 has a major axis 2110, on which its apogee 2106 sits, said major axis 2110 being significantly larger than that of the minor axis 2112 of orbit 2104, giving orbit 2104 its elliptical shape. Orbit 2104 has two perigees 2108A and 2108B, which are the points on orbit 2104 at which it is nearest to celestial body 2102. Orbit 2114, on the other hand, has a major axis 2118 that is nearly equal to its minor axis 2120. Therefore orbit 2114 is considered to be circular.

Embodiments may iterate the process of dragging the tether(s) through the atmosphere over the course of a plurality of orbital passes, reducing the energy of the orbit during each pass.

Figure 22:
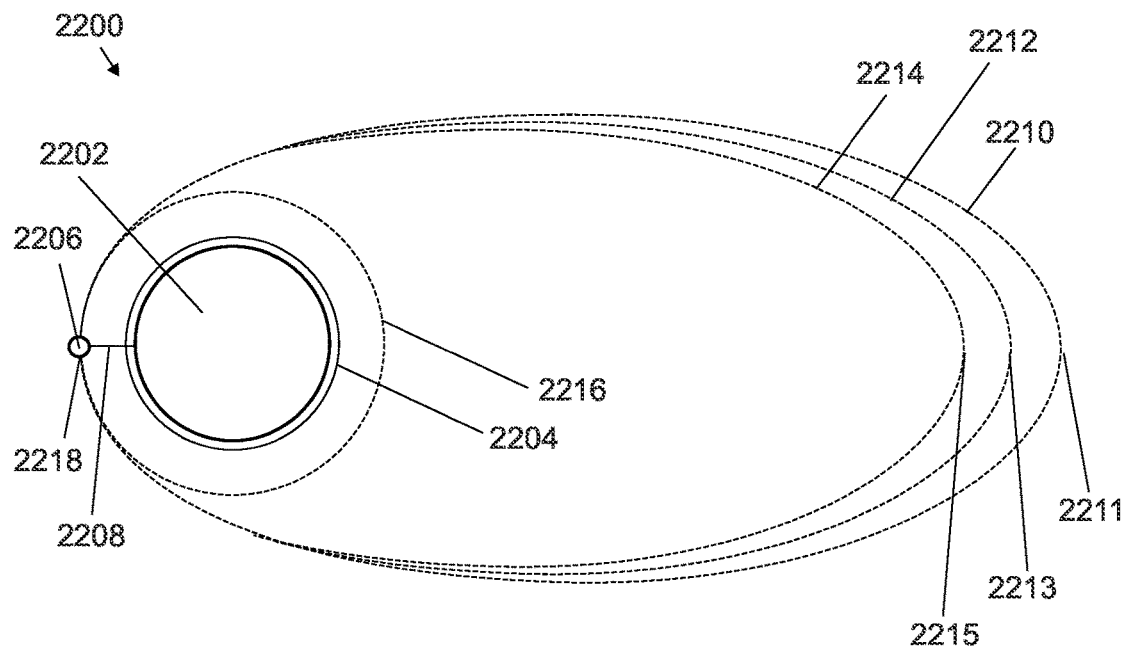
FIG. 22 depicts an exemplary embodiment of a tether-based RCS system, and the way such a system may be used to reduce the energy of, and circularize, the orbit of the system about a celestial body having an atmosphere.

FIG. 22 depicts a simplified system for orbital energy reduction comprising spacecraft 2206 and one or more tether(s) 2208 undergoing a series of decaying orbits (2210, 2212, and 2214), and eventually entering a circular orbit 2216 about celestial body 2202 having atmosphere 2204. Orbit 2210 is the highest energy orbit, followed in order by orbit 2212, orbit 2214, and orbit 2216. Here, all orbits 2210, 2212, 2214, and 2216 have a perigee that is approximately equal, perigee 2218. Spacecraft 2206 transitions from higher energy orbit to lower energy orbit by extending tether(s) 2208 and dragging a portion of tether(s) 2208 through atmosphere 2204 during each orbit of spacecraft 2206 about celestial body 2202. The mechanical interaction between tether(s) 2208 and atmosphere 2204 causes a drag force which is imparted to spacecraft 2206. This drag force removes energy from the orbit of spacecraft 2206, thereby reducing the apogee of the next orbit.

For example, the initial orbit of spacecraft 2206, specifically orbit 2210, may begin at a first energy level, which corresponds to a first apogee 2211. As spacecraft 2206 nears atmosphere 2204 of celestial body 2202 it may drag tether 2208 through atmosphere 2204, thereby generating drag and reducing the energy of orbit 2210, resulting in orbit 2212 with corresponding apogee 2213. This process may be iterated across multiple orbits, resulting in the orbital decay of spacecraft 2206 from orbit 2210 with corresponding apogee 2211, through orbit 2212 with corresponding apogee 2213, to orbit 2214 with corresponding apogee 2215, and eventually leading to a relatively circular and low energy orbit, orbit 2216.

Generally, the force generated by aerobraking (the drag force generated by the frictional interaction between a tether and an atmosphere) will be greatest when the system is at its perigee (here, perigee 2218 is the same for all orbits shown), as this is the point where spacecraft 2206 is closest to and can have the maximum amount of tether(s) 2208 interacting with, atmosphere 2204. As spacecraft 2206 iterates this process the orbital energy reduction will be continued and the orbit of spacecraft 2206 will continue to lose energy and decrease its apogee with each successive orbit.

Embodiments of the orbital energy reduction tether system may utilize a plurality of tethers, which together generate a differential tether force on the spacecraft. For example, a differential tether force system may be configured so that the angle of attack of a forebody of the system is shifted to reduce lift and increase drag, thereby bleeding an increased amount of energy from the orbit. To achieve this change in angle of attack the differential tether force should be oriented to induce a torque on the forebody in a direction opposite to that used to promote skipping during atmospheric entry, discussed above. By configuring the system in a manner so that the differential tether force causes the forebody's angle of attack to alter to increase the drag forces on the forebody, the system may maximize the amount of drag generated, and correspondingly the amount of energy lost from the orbit, during each orbital cycle.

By way of example of this change in orientation of the multi-tether system, when used for high energy orbital decay and eventual atmospheric entry, a spacecraft in a highly elliptical orbit about a celestial body may want to pitch down (have the differential tether force cause a change in the angle of attack of the forebody in order to cause an increase in aerodynamic drag) as the object passes its orbital perigee in order to best reduce the velocity of the object, and thereby reduce the energy of its orbit. This process may be repeated dozens, hundreds, thousands, or more times to decay the object's orbit. However, on the final orbit, in which the object changes from orbiting the celestial body and enters an atmospheric entry, the tether configuration or orientation should be flipped such that the differential tether force causes the forebody to pitch up (have the differential tether force cause a change in the angle of attack of the forebody to cause an increase in aerodynamic lift) in order to have the reduction of velocity of the object to be as gradual as possible.

To achieve orbital energy reduction a tether may partially inserted into the atmosphere of a celestial body and used as an aerobrake at or near the orbit's perigee, to reduce the orbit's apogee and overall orbital energy. Then, when the orbit has been reduced to a near circular orbit (e.g., low Earth orbit), the tether may be used to control the angle of attack of the spacecraft as it enters and traverses the atmosphere, as discussed in greater detail below. The "orbital energy reduction" tether used for aerobraking the spacecraft from a high-energy orbit into lower energy orbit could be a long tether and the "atmospheric entry" (aka RCS) tether used for controlling the spacecraft's angle of attack could be a short tether, or the same long tether after having been reduced in length. They can be two separate systems, or they may be one system having a tether, or tethers, and may have systems to allow for the tether(s) to have controllable lengths.

A tether may be deployed from the spacecraft and dipped into an atmosphere of a celestial body at a point in the spacecraft's orbit about the celestial body. As discussed above, the transit of the tether through the atmosphere will result in frictional drag thereby generating a change in the spacecraft's angular and downward velocities. This effect is most pronounced as the spacecraft passes through the perigee of its orbit as that is the point in time during which the tether 1) has the greatest part of its length interacting with the atmosphere, and 2) has its distal end at the lowest altitude and therefore in the densest portion of the atmosphere. The effect of the tether's drag acting on the spacecraft's orbit is that there will be a reduction in the orbit's eccentricity and semi-major axis after the perigee of every orbital pass. Additionally, in each orbit, the eccentricity reduces progressively along with the velocity of the forebody.

For the orbital energy reduction system to be effective, perigee altitude needs to be kept sufficiently low so that the system interacts with the upper atmosphere significantly. Experimentally, it has been determined that below ~95 km altitude the system is useful for control. This means that the forebody needs to be in a transfer orbit with closer perigee below 95 km. This does not mean that the system may not be used for orbits having a perigee greater than 95 km, but rather that at greater altitudes only the distal end of the long tether, and not the forebody will have any meaningful interaction with the atmosphere. In such cases the orbital energy will still reduce through successive orbits due to the drag generated by the tether, but the rate of reduction will be smaller.

Figure 23A:
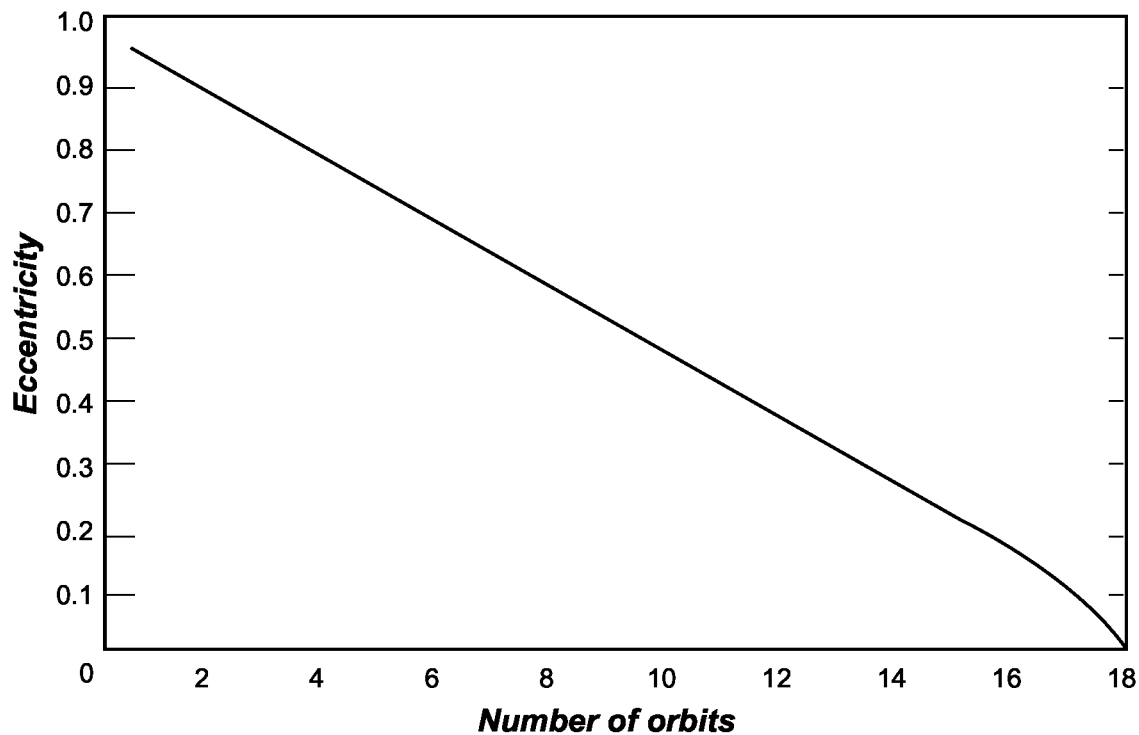
FIG. 23A depicts a graph showing orbital eccentricity vs number of orbits for an exemplary embodiment of a tether-based system for orbital energy reduction undergoing an exemplary embodiment of the method of orbital energy reduction depicted in FIG. 20.

FIG. 23A depicts a graph, graph 2300A, showing orbital eccentricity vs number of orbits for an exemplary embodiment of a tether-based system for orbital energy reduction undergoing an exemplary embodiment of the method of orbital energy reduction discussed hereinabove in reference to FIG. 20.

Figure 23B:
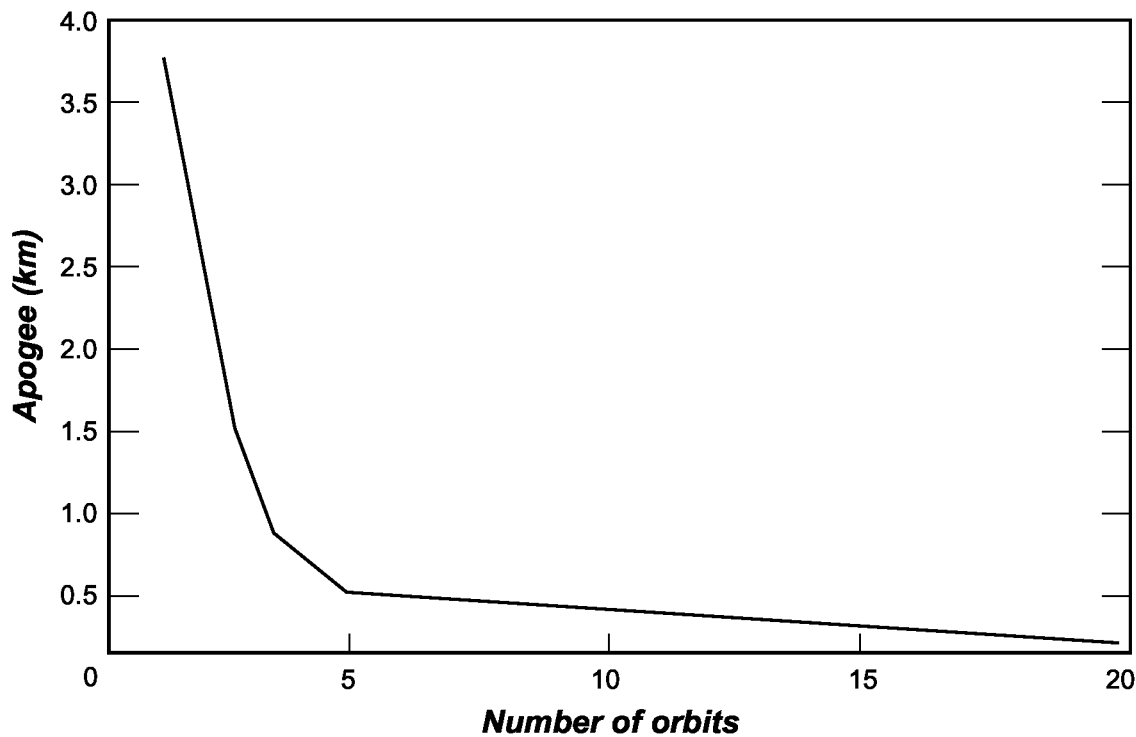
FIG. 23B depicts a graph showing orbital apogee vs number of orbits for the exemplary embodiment of a tether-based system for orbital energy reduction detailed above in reference to FIG. 23A.

FIG. 23B depicts a graph, graph 2300B, showing orbital apogee vs number of orbits for the same exemplary embodiment of a tether-based system for orbital energy reduction undergoing an exemplary embodiment of the method of orbital energy reduction as that of FIG. 23A.

The graphs shown in FIGS. 24A-F detail various flight characteristics of an exemplary tether-based system for orbital energy reduction undergoing an exemplary embodiment of the method of orbital energy reduction shown in FIG. 20, across a multitude of its orbits.

Figure 24A:
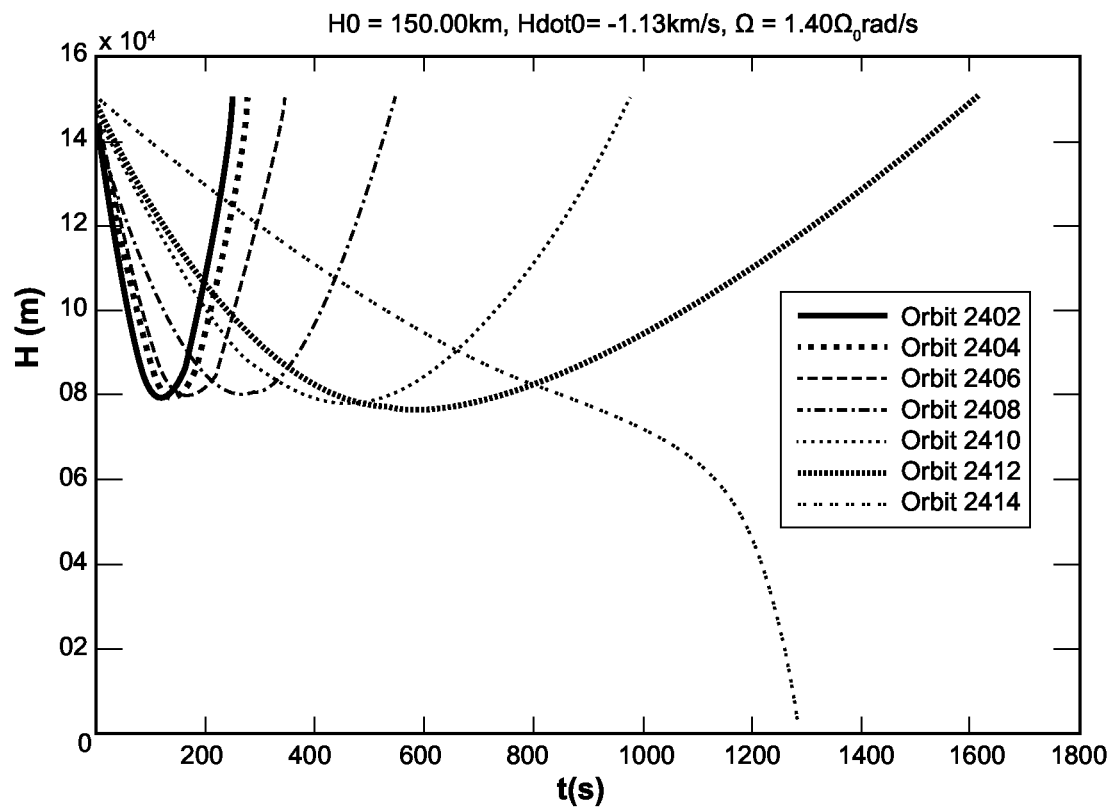
FIG. 24A depicts a graph showing altitude vs time for an exemplary embodiment of a tether-based system for orbital energy reduction undergoing an exemplary embodiment of the method of orbital energy reduction depicted in FIG. 20.

FIG. 24A depicts a graph, graph 2400A, showing altitude vs time for the tether-based system for orbital energy reduction across multiple orbits. It can be seen in graph 2400A that first orbit, orbit 2402, spends only a short amount of time near its perigee before quickly gaining altitude, while during subsequent orbits (including, in order, orbits 2404, 2406, 2408, 2410, and 2412) the system spends longer times at lower altitudes, until the final orbit, orbit 2414 occurs, and the system deorbits and performs reentry.

Figure 24B:
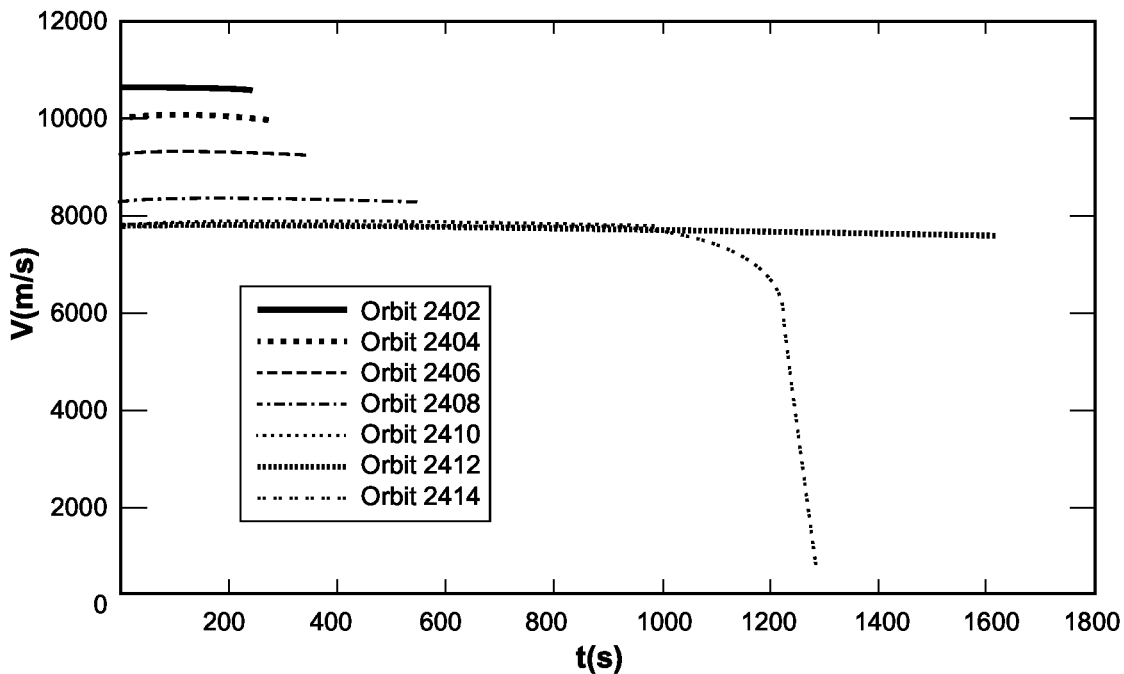
FIG. 24B depicts a graph showing velocity vs time for the exemplary embodiment of a tether-based system for orbital energy reduction detailed above in reference to FIG. 24A.

FIG. 24B depicts a graph, graph 2400B, showing velocity vs time for the tether-based system for orbital energy reduction across multiple orbits. It can be seen from graph 2400B that the system is at its highest velocity during first orbit, orbit 2402, and that the velocity of the system is lower during each subsequent orbit (including, in order, orbits 2404, 2406, 2408, 2410, and 2412), until the final orbit, orbit 2414 occurs, and the system deorbits and performs reentry, at which point the system's velocity decreases precipitously due to the system experience large drag forces caused by the entire system, rather than just a portion of its tether(s), interacting with the atmosphere.

Figure 24C:
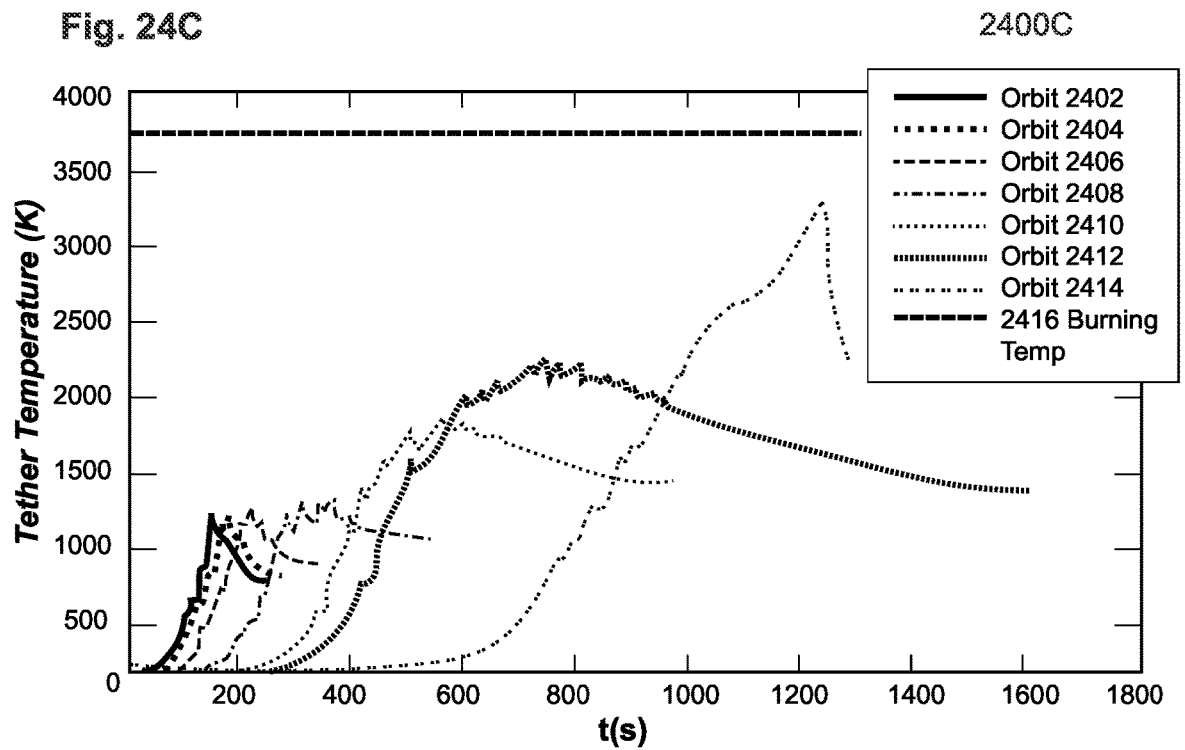
FIG. 24C depicts a graph showing tether temperature vs time for the exemplary embodiment of a tether-based system for orbital energy reduction detailed above in reference to FIG. 24A.

FIG. 24C depicts a graph, graph 2400C, showing tether temperature vs time for the tether-based system for orbital energy reduction across multiple orbits.

Figure 24D:
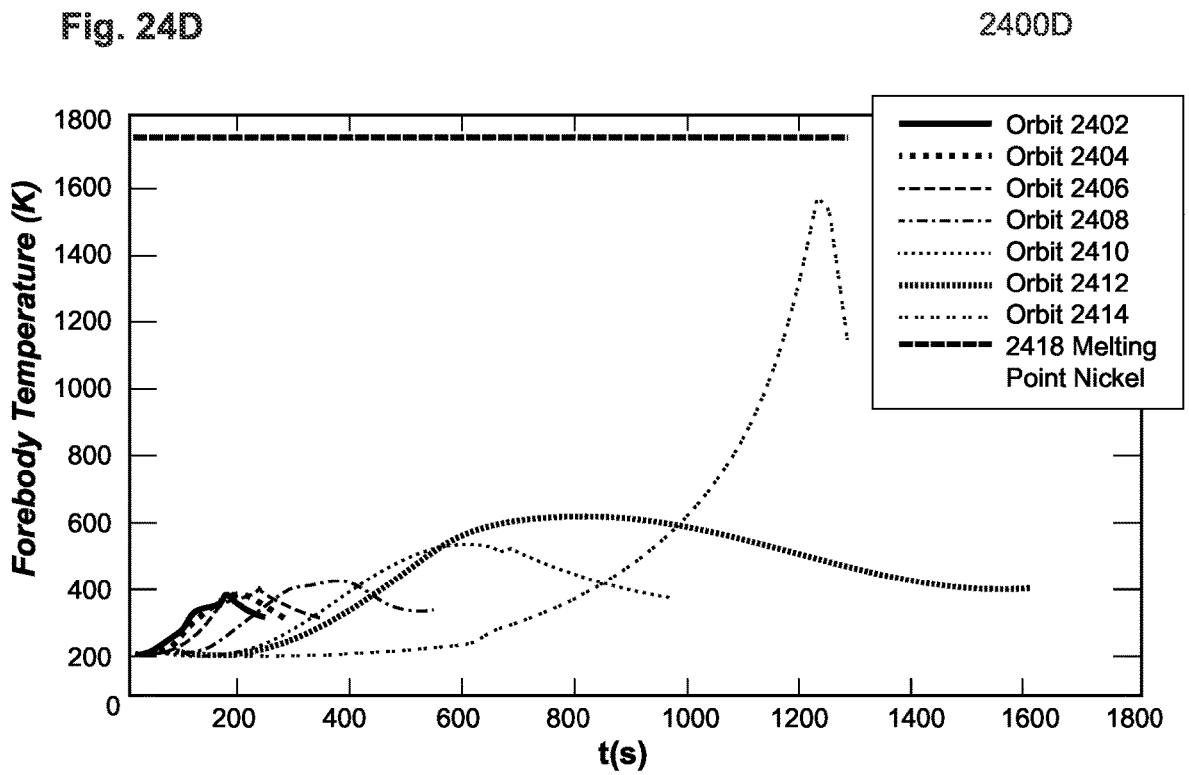
FIG. 24D depicts a graph showing forebody temperature vs time for the exemplary embodiment of a tether-based system for orbital energy reduction detailed above in reference to FIG. 24A.

FIG. 24D depicts a graph, graph 2400D, showing forebody temperature vs time for the tether-based system for orbital energy reduction across multiple orbits.

Figure 24E:
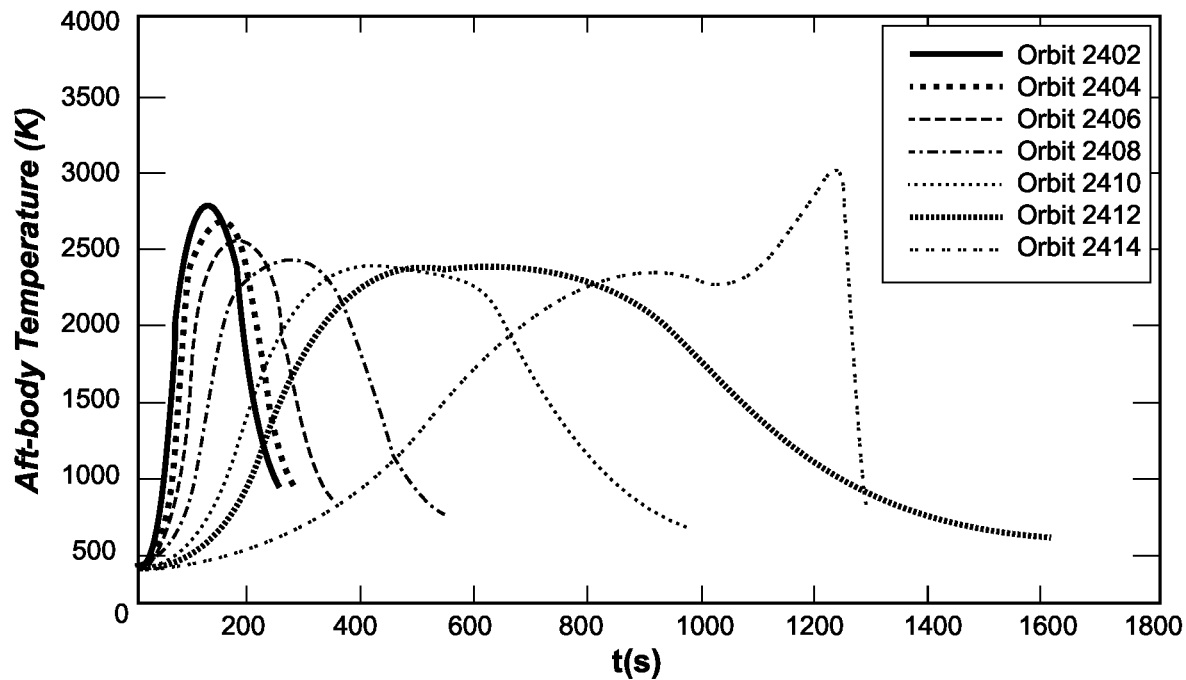
FIG. 24E depicts a graph showing aftbody temperature vs time for the exemplary embodiment of a tether-based system for orbital energy reduction detailed above in reference to FIG. 24A.

FIG. 24E depicts a graph, graph 2400E, showing aftbody temperature vs time for the tether-based system for orbital energy reduction across multiple orbits.

Graphs 2400C-E demonstrate that tether temperature, forebody temperature, and aftbody temperature all increase as the tether-based system for orbital energy reduction executes more and more orbits. Such incremental increases in heating are likely due to the system descending further and further into an atmosphere during each successive orbit, which causes the components of the system to experience increased heating due to increased friction with the atmosphere, which may be caused increasing amounts of the system interacting with the atmosphere and/or the system's interacting with denser portions of the atmosphere.

Figure 24F:
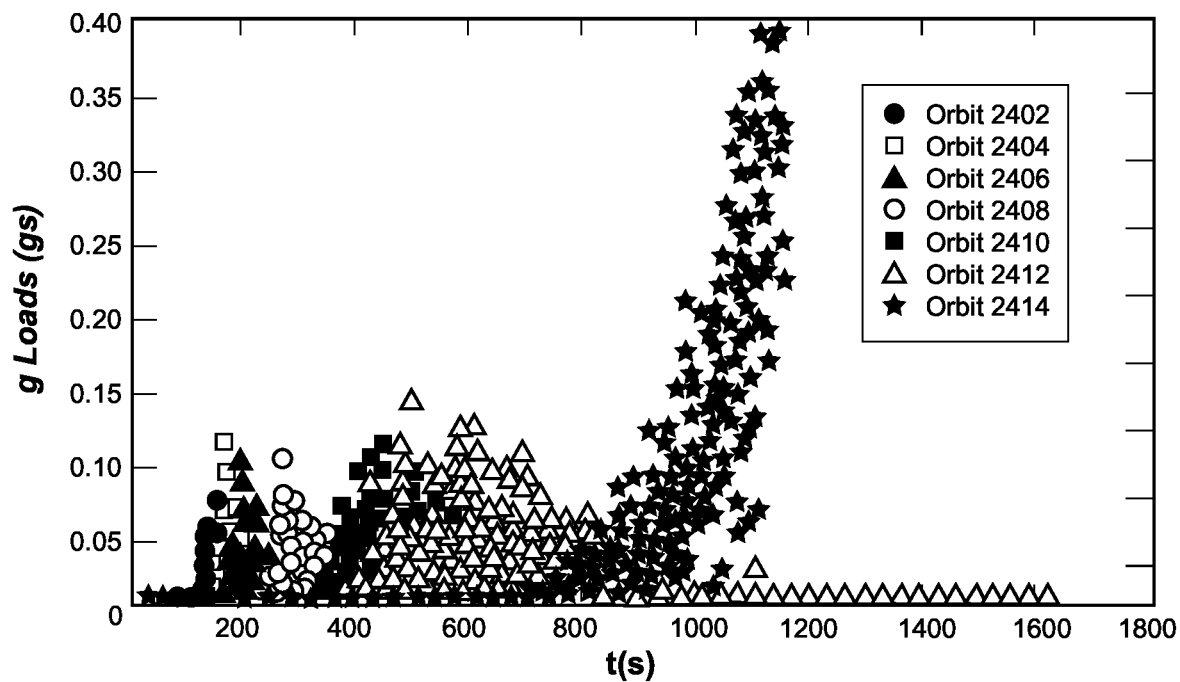
FIG. 24F depicts a graph showing forebody g-load vs time for the exemplary embodiment of a tether-based system for orbital energy reduction detailed above in reference to FIG. 24A.

FIG. 24F depicts a graph, graph 2400F, showing forebody g-load vs time for the tether-based system for orbital energy reduction across multiple orbits. Graph 2400F shows that the g-loads experienced by a system undergoing this method of orbital energy reduction may be relatively minimal, only increasing slightly across subsequent orbits, until it spikes during final orbit 2414.

While the present systems and methods have been disclosed according to some preferred embodiments of the invention, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the invention to those particular embodiment configurations. These terms may reference the same or different embodiments, and unless indicated otherwise, are combinable into aggregate embodiments. The terms "a", "an" and "the" mean "one or more" unless expressly specified otherwise. The term "connected" means "communicatively connected" unless otherwise defined.

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of methods for determining the composition of a fluid known in the art, the detailed embodiments are intended to be illustrative only and should not be taken as limiting the scope of the invention. Rather, what is claimed as the invention is all such modifications as may come within the spirit and scope of the following claims and equivalents thereto.

None of the descriptions in this specification should be read as implying that any particular element, step or function is an essential element which must be included in the claim scope. The scope of the patented subject matter is defined only by the allowed claims and their equivalents. Unless explicitly recited, other aspects of the present invention as described in this specification do not limit the scope of the claims.

To aid the Patent Office and any readers of any patent issued on this application in interpreting the claims appended hereto, the applicant wishes to note that it does not intend any of the appended claims or claim elements to invoke 35 U.S.C. 112 (f) unless the words "means for" or "step for" are explicitly used in the particular claim.

What is claimed is:
1. A spacecraft reaction control system comprising:
a forebody having a center of mass;
a plurality of tethers attached to and extending from said forebody, wherein at least two of the plurality of tethers are connected by a ladder element, and wherein a differential tether force generated by drag acting on the plurality of tethers during reentry is offset from the center of mass.

2. The spacecraft reaction control system of claim 1, wherein at least one of the plurality of tethers comprises a length different than that of another of the plurality of tethers.

3. The spacecraft reaction control system of claim 1, wherein at least one of the plurality of tethers is positively offset from the center of mass in a first axis, and wherein a second tether is negatively offset from the center of mass in the first axis.

4. The spacecraft reaction control system of claim 1, wherein at least one of the plurality of tethers is offset from the center of mass in a first axis, and wherein a second tether is offset from the center of mass in a second axis.

5. The spacecraft reaction control system of claim 1, wherein the forebody comprises at least one of:
   a space shuttle;
   a satellite;
   an orebody;
   a space suit;
   a space plane;
   a capsule; and
   a rocket engine or stage thereof.

6. The spacecraft reaction control system of claim 1, wherein the differential tether force generates one or more of a pitch, a yaw, and a roll in the forebody.

7. The spacecraft reaction control system of claim 1, further comprising an aftbody attached to a free end of the length at least one of the plurality of tethers.

8. The spacecraft reaction control system of claim 7, further comprising a plurality of aftbodies, wherein each of the plurality of aftbodies is attached to a respective tether from the plurality of tethers.

9. The spacecraft reaction control system of claim 8, wherein at least one of the plurality of aftbodies comprises aerodynamic characteristics that are different than another of the plurality of aftbodies.

10. The spacecraft reaction control system of claim 1, further comprising a tether control mechanism connected to and between the forebody and at least one of the plurality of tethers, the tether control mechanism configured to change a tether characteristic over time.

11. The spacecraft reaction control system of claim 10, wherein the tether characteristic comprises a tether length.

12. The spacecraft reaction control system of claim 10, wherein the tether characteristic comprises a location of a tether attachment point.

13. The spacecraft reaction control system of claim 10, wherein the tether control mechanism is configured to change the tether characteristic responsive to a determination made based on data collected by one or more sensors.

14. A method of controlling a spacecraft during reentry comprising, generating a differential tether force between a plurality of tethers connected to the spacecraft and an atmosphere, wherein one or more of at least two of the plurality of tethers are connected by a ladder element and at least one of the plurality of tethers is connected to the forebody via a lever arm, whereby application of the differential tether force is functionally offset from a center of mass of the spacecraft.

15. The method of controlling a spacecraft during reentry of claim 14, wherein application of the differential tether force is functionally offset from the center of mass such that the differential tether force causes a change in an angle of attack of the spacecraft.

16. The method of controlling a spacecraft during reentry of claim 14, further comprising monitoring one or more flight conditions, and changing least one tether characteristic responsive to said flight conditions.

17. A spacecraft reaction control system comprising:
   a forebody having a center of mass;
   a plurality of tethers attached to and extending from said forebody; and
   a lever arm positioned between and connected to the forebody and at least one of the plurality of tethers, whereby a differential tether force generated by drag acting on the plurality of tethers during reentry is offset from the center of mass.

18. The spacecraft reaction control system of claim 17, wherein at least one of the plurality of tethers is positively offset from the center of mass in a first axis, and wherein a second tether is negatively offset from the center of mass in the first axis.

19. The spacecraft reaction control system of claim 17, wherein at least one of the plurality of tethers is offset from the center of mass in a first axis, and wherein a second tether is offset from the center of mass in a second axis.

20. The spacecraft reaction control system of claim 17, wherein the differential tether force generates one or more of a pitch, a yaw, and a roll in the forebody.

21. The spacecraft reaction control system of claim 17, further comprising an aftbody attached to a free end of the length at least one of the plurality of tethers.

22. The spacecraft reaction control system of claim 17, further comprising a tether control mechanism connected to and between the forebody and at least one of the plurality of tethers, the tether control mechanism configured to change a tether characteristic over time.

* * * * *

UNITED STATES PATENT AND TRADEMARK OFFICE
CERTIFICATE OF CORRECTION

| | |
|---|---|
| PATENT NO. | : 12,286,245 B2 |
| APPLICATION NO. | : 18/304812 |
| DATED | : April 29, 2025 |
| INVENTOR(S) | : Arthur M. Dula, Neha Satak and Prasad Laxminarayana |

Page 1 of 1

It is certified that error appears in the above-identified patent and that said Letters Patent is hereby corrected as shown below:

In the Specification

Column 1, Line 63-64:
Currently reads: "application Ser. No. 61/646,963, entitled "Tether for spacecraft"
Should read: "application Ser. No. 61/464,963, entitled "Tether for spacecraft"

Signed and Sealed this
Fourteenth Day of October, 2025

John A. Squires
*Director of the United States Patent and Trademark Office*